United States Patent
Giaretta et al.

(10) Patent No.: US 10,412,013 B2
(45) Date of Patent: *Sep. 10, 2019

(54) APPLICATION TRAFFIC PAIRING

(71) Applicant: QUALCOMM Incorporated, San Diego, CA (US)

(72) Inventors: Gerardo Giaretta, Altavilla Vicentina (IT); Sivaramakrishna Veerepalli, San Diego, CA (US); Kalle Ilmari Ahmavaara, San Diego, CA (US); Roozbeh Atarius, La Jolla, CA (US); John Wallace Nasielski, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,452

(22) Filed: May 30, 2018

(65) Prior Publication Data
US 2018/0278534 A1 Sep. 27, 2018

Related U.S. Application Data

(63) Continuation of application No. 14/168,836, filed on Jan. 30, 2014, now Pat. No. 10,015,102.
(Continued)

(51) Int. Cl.
*H04L 12/851* (2013.01)
*H04L 12/26* (2006.01)
(Continued)

(52) U.S. Cl.
CPC .......... *H04L 47/2441* (2013.01); *G06F 11/34* (2013.01); *H04L 41/0893* (2013.01); *H04L 43/062* (2013.01); *H04L 67/22* (2013.01)

(58) Field of Classification Search
CPC ............ H04L 47/2441; H04L 41/0893; H04L 43/062; H04L 67/22; G06F 11/34
See application file for complete search history.

(56) References Cited

U.S. PATENT DOCUMENTS 6,141,686 A 10/2000 Jackowski et al.
7,664,048 B1 * 2/2010 Yung ................ H04L 41/28
370/235
(Continued)

FOREIGN PATENT DOCUMENTS

CN 101155074 A 4/2008
EP 1906628 A1 4/2008
(Continued)

OTHER PUBLICATIONS

"Digital cellular telecommunications system (Phase 2+), Universal Mobile Telecommunications System (UMTS), Telecommunication management; Performance Management (PM); Concept and requirements (3GPP TS 32.401 version 5.1.0 Release 5); ETSI TS 132 401", IEEE, LIS, Sophia Antipolis Cedex, France, vol. 3-SA5, No. V5.1.0, Sep. 1, 2002 (Sep. 1, 2002), XP014010017, ISSN: 0000-0001.
(Continued)

*Primary Examiner* — Viet D Vu
(74) *Attorney, Agent, or Firm* — Dalei Dong; Paradice and Li

(57) ABSTRACT

Systems, devices, and methods for reporting information in real time about traffic generated by each application for a device are described. In one aspect, the network can configure a list of applications user equipment (UE) devices need to report traffic information for and then when one of these applications starts a communication, the UE may send traffic descriptor(s) describing the traffic generated by the application. In this way the network can accurately identify (Continued)

the traffic and take actions based on UE report and local policy or subscription.

28 Claims, 16 Drawing Sheets

Related U.S. Application Data

(60) Provisional application No. 61/810,867, filed on Apr. 11, 2013.

(51) Int. Cl.
*H04L 29/08* (2006.01)
*H04L 12/24* (2006.01)
*G06F 11/34* (2006.01)

(56) References Cited

U.S. PATENT DOCUMENTS

| | | |
|---|---|---|
| 7,787,470 B2 | 8/2010 | Rajagopalan |
| 2008/0034419 A1 | 2/2008 | Mullick et al. |
| 2009/0296136 A1 | 12/2009 | Tanaka |
| 2010/0043053 A1 | 2/2010 | Wei et al. |
| 2010/0332649 A1 | 12/2010 | Proulx et al. |
| 2011/0069685 A1 | 3/2011 | Tofighbakhsh |
| 2011/0096749 A1 | 4/2011 | Rune |
| 2011/0219426 A1 | 9/2011 | Kim et al. |
| 2012/0206754 A1 | 8/2012 | Aota |
| 2012/0254309 A1 | 10/2012 | Tokashiki |
| 2013/0023230 A9 | 1/2013 | Momtahan et al. |
| 2013/0070593 A1 | 3/2013 | Hu et al. |
| 2013/0077491 A1 | 3/2013 | Cherian et al. |
| 2013/0183951 A1 | 7/2013 | Chien |
| 2014/0310402 A1 | 10/2014 | Giaretta et al. |

FOREIGN PATENT DOCUMENTS

| | | |
|---|---|---|
| EP | 1973266 A1 | 9/2008 |
| JP | 2001255955 A | 9/2001 |
| JP | 2008084246 A | 4/2008 |
| JP | 2009290464 A | 12/2009 |
| JP | 2012166500 A | 9/2012 |
| JP | 2012208672 A | 10/2012 |

OTHER PUBLICATIONS

International Preliminary Report on Patentability—PCT/US2014/033046, The International Bureau of WIPO—Geneva, Switzerland, dated Jul. 24, 2015.
International Search Report and Written Opinion—PCT/US2014/033046—ISA/EPO—dated Oct. 17, 2014.
Orange : "Correction on charging requirements at PCEF", 3GPP DRAFT; S2-130418—REL-12 CR 23203 on Charging Requirements at PCEF, 3rd Generation Partnership Project (3GPP), Mobile Competence Centre; 650, Route Des Lucioles; F-06921 Sophia-Antipolis Cedex, vol. SA WG2, no. Prague, Czech Republic; 20130128-20130201, Jan. 22, 2013 (Jan. 22, 2013), XP050684950, Retrieved from the Internet: URL:http://www.3gpp.org/ftp/tsg_sa/WG2_Arch/TSGS2_95_Prague/Docs/.

* cited by examiner

APPLICATION TRAFFIC PAIRING

CROSS-REFERENCE TO RELATED APPLICATIONS

This application is a continuation of U.S. patent application Ser. No. 14/168,836, filed on Jan. 30, 2014, now U.S. Pat. No. 10,015,102, which claims priority and benefit under 35 U.S.C. § 119(e) to U.S. Provisional Application No. 61/810,867, filed on Apr. 11, 2013, entitled "Application Traffic Pairing," the disclosures of which are hereby incorporated herein by reference in their entirety. Any and all priority claims identified in the Application Data Sheet, or any correction thereto, are hereby incorporated by reference under 37 C.F.R. § 1.57.

BACKGROUND

Field

The present application relates generally to wireless communications, and more specifically to systems, methods, and devices for identifying application-level communications.

Background

Applications ("apps") or device applets are now available that operate to provide a wide range of add-on services and features to wireless devices. For example, it is now possible for wireless devices to download and launch device applets to perform value-added functions such as, shopping, searching, position location, driving navigation, video conferencing, social networking, and an array of other functions. The availability and use of device applets increases the functionality and usability of wireless devices and offers device users features and convenience not originally available on the devices themselves.

The applications may be developed and/or deployed by the network operator, service provider, or third-party providers. As such, the control entity for the network which the application uses for communications may not be the same as the developer of the application. In such instances, controlling the network utilization for the application can be difficult. An aspect of controlling the utilization includes identifying which application is associated with the traffic. This may generally be referred to was application traffic pairing. One way to achieve application traffic pairing and thus control the network utilization for the application is through deep packet inspection. By analyzing the data included one or more packets of data transmitted from a device, the network can infer the application which originated the packet and selectively communicate this information.

However, deep packet inspection can impact communication rates as the packets are intercepted, analyzed, and then transmitted. This can, in turn, impact the user experience. Deep packet inspection may also dependent on a static packet "signature." For example, a packet structure may be associated with a first version of an application. However, in version two, the packet structure for the same application may be changed. To accurately and effectively identify communication for the application, the network operator would need to continually monitor and update the inspection routines. As each application may consume different types and quantities of network resources. Furthermore, deep packet inspection generally involves introducing additional cost to the network as hardware, power, and other resources are consumed to coordinate and maintain the inspection process.

The current "network-only" solutions hinder the operator's ability to offer data subscription bundles to specific applications or differentiation in terms of Quality of Service. Accordingly, a reliable, efficient, and accurate mechanism to allow network operators the ability to provide per application behavior in their network is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description" one will understand how the features of this invention provide advantages that include decreasing the size of a communication policy, thereby reducing the overhead in storing and processing the policy when running applications.

In one innovative aspect, a method of network communication is provided. The method includes receiving policy information including one or more application identifiers for traffic flow reporting. The method further includes storing the received policy information. The method also includes identifying a network operation for an application. The method further includes comparing an application identifier for the application to the one or more application identifiers included in the policy information. The method also includes when the application is included in the policy information, transmitting a traffic descriptor and one of the application identifiers for the application, the traffic descriptor and the one of the application identifiers uniquely identifying a traffic flow for the application.

In another innovative aspect, a network communication device is provided. The device includes a receiver configured to receive policy information including one or more application identifiers for traffic flow reporting. The device includes a memory configured to store the received policy information. The device further includes a processor configured to identify a network operation for an application. The processor is further configured to compare an application identifier for the application to the one or more application identifiers included in the policy information. The device includes a transmitter configured to, when the application is included in the policy information, transmit a traffic descriptor and one of the application identifiers for the application, the traffic descriptor and the one of the application identifiers uniquely identifying a traffic flow for the application.

In yet another innovative aspect, another method of network communication is provided. The method includes transmitting policy information for one or more applications, the policy information including one or more application identifiers for traffic flow reporting. The method also includes receiving a traffic descriptor and one of the application identifiers for an application of the one or more applications, the traffic descriptor and the one of the application identifiers uniquely identifying a traffic flow for the application.

In a still further innovative aspect, another network communication device is provided. The device includes a transmitter configured to transmit policy information for one or more applications, the policy information including one or more application identifiers for traffic flow reporting. The device also includes a receiver configured to receive a traffic descriptor and one of the application identifiers for an application of the one or more applications, the traffic pattern descriptor uniquely identifying a traffic flow for the application.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
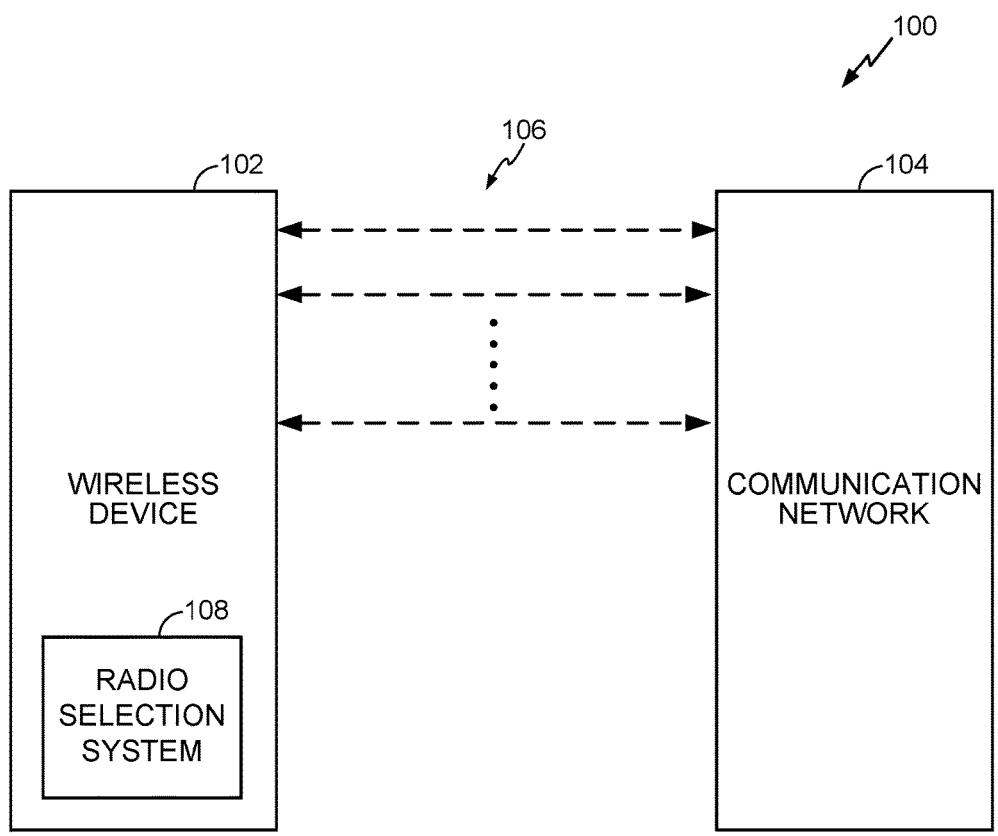
FIG. 1 shows an exemplary network environment 100 illustrating aspects of n radio selection system 108.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.15, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cmda2000 is described in documents from an organization named "3rd Generation Partnership Project 2" (3GPP2). These various radio technologies and standards are known in the art.

Described in further detail below are systems, devices, and methods in which the device reports information in real time about traffic generated by each application running and/or deployed thereon. Specifically, the network operator can configure a list of applications the device needs to report traffic information for. When one of these applications starts communicating with the network, the device can send information describing the traffic generated by the application. This information allows identification of the traffic for this instance of the application for this device. In this way the network operator may easily and accurately identify traffic on a per-device/per-application level. Furthermore, the network operator may take actions based on reported traffic information and local policy or subscription. Such actions include applying quality of service for the traffic flow (e.g., communication pathway), monitoring the traffic for the traffic flow, metering the traffic for the traffic flow, and the like.

FIG. 1 shows an exemplary network environment 100 illustrating aspects of a radio selection system 108. The network environment 100 includes a wireless device 102 and a communication network 104. The device 102 includes a plurality of radios (not shown) to communicate with the network 104 using corresponding radio channels 106. The device 102 also includes a radio selection system 108 that operates to select a particular radio to be used by a particular application.

During operation, the device 102 executes applications which may interface with the network 104 using any of the plurality of radios. For example, an executing application may issue a networking function call, such as a socket layer call, to request a network resource for communication with the network 104. In an embodiment, the radio selection system 108 may process the socket layer call based on a default routing configuration to bind a pre-determined radio resource to the application.

In various implementations, the radio selection system 108 operates to intercept the networking function call from the application and to select an appropriate radio for use by the application. The ratio selection system 108 then binds the application to the network resource (e.g., the radio that has been selected). Because the radio selection system 108 operates in response to the normal operations of the applications when they use a radio resource, the system may operate with both legacy and non-legacy applications without any application changes or upgrades.

The radio selection system 108 may be configured to receive reporting rules for one or more applications. The reporting rules may identify which applications the communication network 104 wants connection information for. In some implementations, the reporting rules may be further specified per radio channel 106. In one implementation, the reporting rules may be a list of application identifiers. If an application identifier appears on the list, the network operator expects the device executing an instance of the application to transmit a traffic report for the application. A traffic report may be referred to, in some implementations, as a traffic descriptor. Table 1 below provides another example of reporting rules which may be maintained by the radio selection system 108. In the example shown in Table 1, the rules include application identifier and a reporting frequency indicating how often the device should transmit a traffic report for the associated application.

TABLE 1

| Application Identifier | Traffic Reporting Frequency |
| --- | --- |
| 86A25042-970A-11E2-A4CB-7BC46188709B | On connect |
| 0x9B6018CA970A11E2912B80C46188709B | Every 15 minutes for device |
| vCF7qAqX4hGh84jEYYhwmw== | Every 30 seconds for application |

The example reporting rules in Table 1 include application identifiers in normal text, hex encoded, and base64 encoded formats. These are simply provided as examples and other forms of application identifier values may be included. The reporting frequencies are also provided as examples. Reporting may be requested based on an event such as when the application creates an initial connection (e.g., on connect), when the application shuts down, when the device powers up, when a service of the device/application is activated (e.g., location services, video services), when the device transitions state (e.g., IDLE to ACTIVE), when the device hands-off, and the like. Reporting may be requested based on time such as every n-minutes (e.g., 60 minutes), every n-days (e.g., 1 day), or the like. The time may specify the time for the device (e.g., device running for 15 minutes) or for the application (e.g., application running for 30 second). Other formats and/or additional features may be included in the reporting rules without departing from the scope of the disclosure. For example, the rules may also include a start and/or end timestamp indicating a period during which the rule is active. The rules may include version information indicating a version of the rules or rule. The rules may include the information to be reported such as source IP, destination IP, source port, destination port, communication protocol (e.g., hypertext transfer protocol (HTTP), HTTP secure (HTTPS), file transfer protocol (FTP), session initiation protocol (SIP), secure shell (SSH), a binary communication protocol, or other predetermined communication protocol), device identifier (e.g., international mobile equipment identifier (IMEI), mobile equipment identifier (MEID), media access control address, etc.)

The reporting rules may be pre-loaded in a memory of the wireless device 102. The reporting rules may be loaded into a memory of the wireless device 102 when the associated application is installed. The reporting rules may be received from the communication network 104 via one or more radio channels 106 and stored in a memory of the wireless device 102.

The radio selection system 108 may be further configured to collect and report information about the application connection such as application identifier, source (e.g., device) IP address, source port, communication protocol, destination (e.g., server) IP address, destination port, and the like. In part because the radio selection system 108 is located between the application and the radios used for communications for the application, the radio selection system 108 can determine whether a reporting rule is specified for the device applications. For instance, when an application requests a communication channel, the radio selection system 108 may identify the appropriate radio technology in addition to checking the reporting rules for the application. If the application has reporting requirements as specified by the received reporting rule, the radio selection system 108 can provide the requested information at the requested frequency (if specified) for the application. Further details of the radio selection system 108 are provided below.

Figure 2:
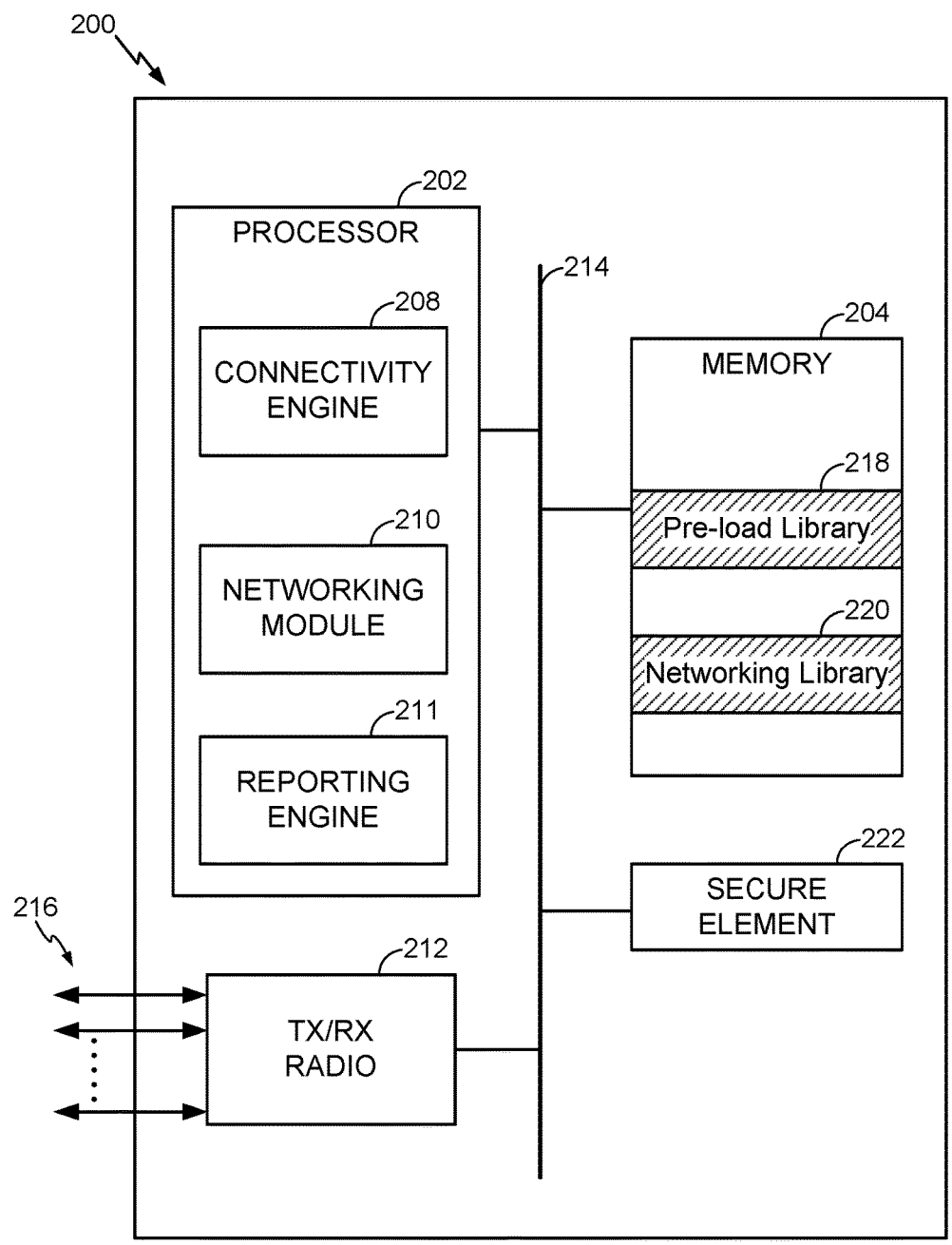
FIG. 2 shows an exemplary wireless device 200 configured to provide radio selection and traffic reporting.

FIG. 2 shows an exemplary wireless device 200 configured to provide radio selection and traffic reporting. The device 200 includes a processor 202, a memory 204, and a TX/RX radio 212, all coupled to communicate using a communication bus 214. The wireless device 200 may be the wireless device 102, described above with respect to FIG. 1. It should be noted that the device 200 is just one implementation and that other implementations are possible.

In one aspect, the processor 202 includes a connectivity engine 208 and a networking module 210. The processor 202 may also include at least one of a CPU, processor, gate array, hardware logic, memory elements, and/or hardware executing software (not shown). The processor 202 is configured to control the operation of the device 200 such that applications executing on the device 200 may be bound to a desired radio. In one implementation, the processor 202 is configured to execute computer-readable instructions related to performing any of a plurality of functions. For example, the processor 202 operates to analyze information received or communicated from the device 200 to effectuate intelligent radio selection. In another aspect, the processor 202 operates to generate information that may be utilized by the memory 204, the TX/RX radio 212, and/or connectivity engine 208 to effectuate radio selection.

The TX/RX radio 212 includes hardware and/or a processor executing software that is configured to provide a plurality of radios/interfaces that may be used to interface the device 200 with a plurality of external entities, such as the external communication network 104 (FIG. 1) using a plurality of radio channels 216. The radio channels 216 may be, for example, the radio channels 106 described above with respect to FIG. 1. The TX/RX radio 212 may provide radios/interfaces to communicate using cellular, Wi-Fi, Bluetooth, or any other technologies to communicate with communication networks using the radio channels 216.

The processor 202 includes hardware and/or a processor executing software that is configured to execute one or more applications on the device 200 and to store the applications in the memory 204. In one implementation, the processor 202 is configured to allow applications to initiate networking function calls to the networking module 210 to request networking services. The networking function calls may include a connection request to a radio/interface at the TX/RX radio 212 for the purpose of communicating with an external network or system via the radio channels 216.

The networking module 210 includes hardware and/or a processor executing software that is configured to perform networking functions. In one implementation, the networking functions include such functions as Connect( ), Bind( ), and Setsockopt( ). A Connect( ) function operates to establish a connection between an application and a particular radio/interface. For example, the particular radio/interface may be selected from the plurality of candidate radios provided by the TX/RX radio 212. In an aspect, networking module 210 is configured to perform a variety of networking functions or commands.

The connectivity engine 208 includes hardware and/or a processor executing software that is configured to assess system resources to select a particular radio for use by an application. In various implementations, the connectivity engine 208 is configured as a centralized radio controller to select the particular radio based on one or more of the following selection criteria.
1. User Policy—policy set by the device user regarding radio access by applications executing at the device.
2. Operator Policy—policy set by network operators regarding network access by devices or applications.
3. Radio metrics—measurements of radio performance or other types of measurements that are used to select the most preferred radio for a particular application or operating environment.
4. Application requirements—requirements associated with requesting applications, such as bandwidth requirements or latency/performance requirements.
5. Network usability—information regarding the availability of a particular network on a particular radio interface.
6. Vendor Supplied Metrics—information to translate from radio metrics such as Receive Signal Strength Indication and Packet Loss Rate to the throughput and latency available for a particular radio interface.
7. Access Point Availability—information specifying the unique identifier for access points congested by lots of traffic from other devices or those that may configure a radio link but do not forward packets to the network.

The memory 204 includes RAM, ROM, EEPROM or any other type of memory device that operates to allow the applications and/or the selection criteria to be stored and retrieved at the device 200. In one implementation, the memory 204 is configured to store computer-readable instructions executed by processor 202. The memory 204 may also be configured to store any of a plurality of other types of data including data generated by any of the processor 202, TX/RX radio 212, application layer component 206, networking module 210, and/or connectivity engine 208. The memory 204 may be configured in a number of different configurations, including as random access memory, battery-backed memory, hard disk, magnetic tape, etc. Various features may also be implemented upon memory 204, such as compression and automatic back up.

The memory 204 is configured to store a pre-load library 218 and a networking library 220. In one implementation, the networking library 220 includes the POSIX or Berkeley sockets application programming interface (API) that includes functions for developing applications in the C programming language that perform inter-process communication, most commonly for communications across a computer network. For example, the POSIX API includes functions, such as Connect( ), Bind( ), and Setsockopt( ).

The pre-load library 218 intercepts socket calls from applications. For example, the pre-load library 218 includes at least a subset of the API functions provided by the networking library 220 a linker may link the networking library 200 into an execution environment at a higher priority than the networking library 220. The linker may be a software component, executed on the processor 202, that serves to link the pre-load library 218 and the networking library 220 for execution on the processor 202.

During operation, the system configures the environment that the linker uses when the device first boots up. In one implementation, the linker operates to check the environment for libraries to load before starting normal library linking. Typically, the linker loads the networking library 220 that provides the networking API. Applications use that interface to create and connect sockets to establish network communications. For example, in one implementation, the linker scans an application and its dependencies, which are both loaded into the memory 204. The linker is configured to load the pre-load library 218 before other libraries and populates the look-ups so libraries loaded subsequently are satisfied and may use the pre-load library 218.

The pre-load library 218 includes at least a subset of the API sockets that the networking library 220 provides. When the application makes a networking function call to create or connect a socket, the processor 202 intercepts the call by executing code in the pre-load library 218. For example, the application provides a function pointer for the Connect( ) function with arguments or attributes, such as an IP Address, Destination, and File Descriptor.

The pre-load library 218 then generates a request to a centralized radio control entity, which chooses an appropriate network interface for the specified connection. For example, the pre-load library 218 sends the request to the connectivity engine 208, which determines the appropriate radio to be used. After the appropriate radio is selected, the processor 202 calls the networking library 220 sockets API to complete the connection setup before control is returned to the pre-load library 218. For example, the connectivity engine 208 calls functions of the networking library 220 to bind the radio that has been selected to the requesting application.

The connectivity engine 208 is configured to select a radio from the plurality of candidate radios in various ways. For example, the connectivity engine 208 may be configured to select a radio using one or more of the above selection criteria. Once a radio is selected, the connectivity engine 208 binds the radio to the application. For example, in one implementation, the connectivity engine 208 binds the radio to the application by calling into the original networking library 220. Thus, functions at the connectivity engine 208 and the pre-load library 218 may easily access functions, such as a Bind( ) function, in the networking library 220 to bind the radio that has been selected to the application.

The reporting engine 211 includes hardware and/or a processor executing software that is configured to process incoming reporting rules (e.g., policy information). The processing may include one or more of decoding the rule(s), reformatting the rule(s) based on the application(s) installed on the device and/or the device capabilities (e.g., operating system, GPS, video, audio), decrypting based on secure key information included in a secure element 222 of the device 200, and storing the reporting rules in the memory 204 or in the secure element 222 of the device.

The secure element 222 may be implemented as a storage (e.g., memory) configured to maintain security of the information stored therein. Because the information for reporting rules may be used for access and/or billing purposes, it may be desirable to ensure the rules are received from an authoritative source and stored such that the rules are not alterable without authorization or detection. For example, a network operator may wish to prevent users from authoring their own reporting rules which would provide free access to services which would otherwise require a valid subscription to access. The secure element 222 may be build-in or embedded in the device 200, added to the device (e.g., SIM card or SD card), or included in the memory 204 as a secured area for storing the reporting rule(s).

The reporting engine 211 may be further configured to determine whether the application is included in the reporting and generate a traffic descriptor and application identifier for an application included in the reporting rules. For example, the connectivity engine 208, upon selection of a radio channel may communicate with the reporting engine 211 the details of the connection. In some implementations, the pre-load library 218 include one or more additional function calls to the reporting engine 211 to perform the determination and reporting.

In various implementations, the radio selection system includes a computer program product having one or more program instructions ("instructions") or sets of "codes" stored or embodied on a computer-readable medium. When the codes are executed by at least one processor, for instance, processor 202, their execution causes the processor 202 to control the device 200 to provide the functions of the system described herein. For example, the computer-readable medium includes a floppy disk, CDROM, memory card, FLASH memory device, RAM, ROM, or any other type of memory device or tangible computer-readable medium (e.g., non-transitory) that interfaces to the device 200. In another aspect, the sets of codes may be downloaded into the device 200 from an external device or communication network resource. The sets of codes, when executed, operate to provide aspects of the system described herein.

Figure 3:
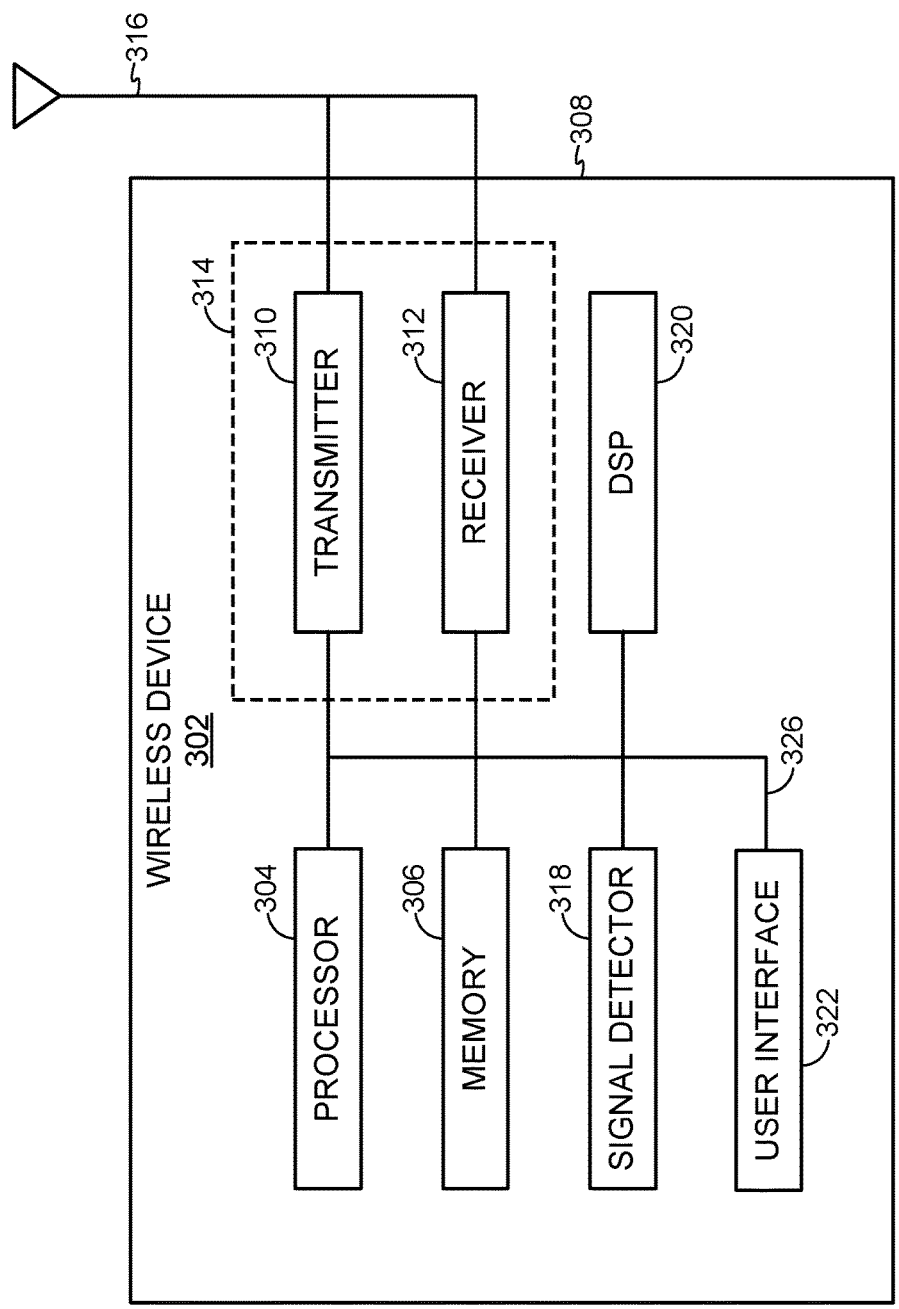
FIG. 3 shows an exemplary wireless device 302 configured to provide application traffic pairing.

FIG. 3 shows an exemplary wireless device 302 configured to provide application traffic pairing. The wireless device 302 may be employed within the wireless communication system 100, described above with respect to FIG. 1. The wireless device 302 is an example of a device that may be configured to implement the various methods described herein. For example, the wireless device 302 may implement one or more functions of the communication network 104. In another embodiment, the wireless device 302 may implement one or more functions of the wireless device 102.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

When the wireless device 302 is implemented or used as a transmitting node, the processor 304 may be configured to transmit communication policies, such as the reporting rule(s) described herein. When the wireless device 302 is implemented or used as a receiving node, the processor 304 may be configured to receive data from the wireless device 200, described above with respect to FIG. 2. When the wireless device 302 is implemented or used as a receiving node, the processor 304 may be further configured to cause application traffic information to be reported based at least in part on received reporting rule(s).

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and/or a receiver 312 to allow transmission and reception of data between the wireless device 302 and a remote location. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The transmitter 310 may be configured to wirelessly transmit packets having different MAC header types. For example, the transmitter 310 may be configured to transmit packets with different types of headers generated by the processor 304, discussed above.

The receiver 312 may be configured to wirelessly receive packets having different MAC header type. In some aspects, the receiver 312 is configured to detect a type of a MAC header used and process the packet accordingly, as discussed in further detail below.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. The DSP 320 may be configured to generate a packet for transmission. In some aspects, the packet may comprise a physical layer data unit (PPDU).

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

The various components of the wireless device 302 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

Figure 4:
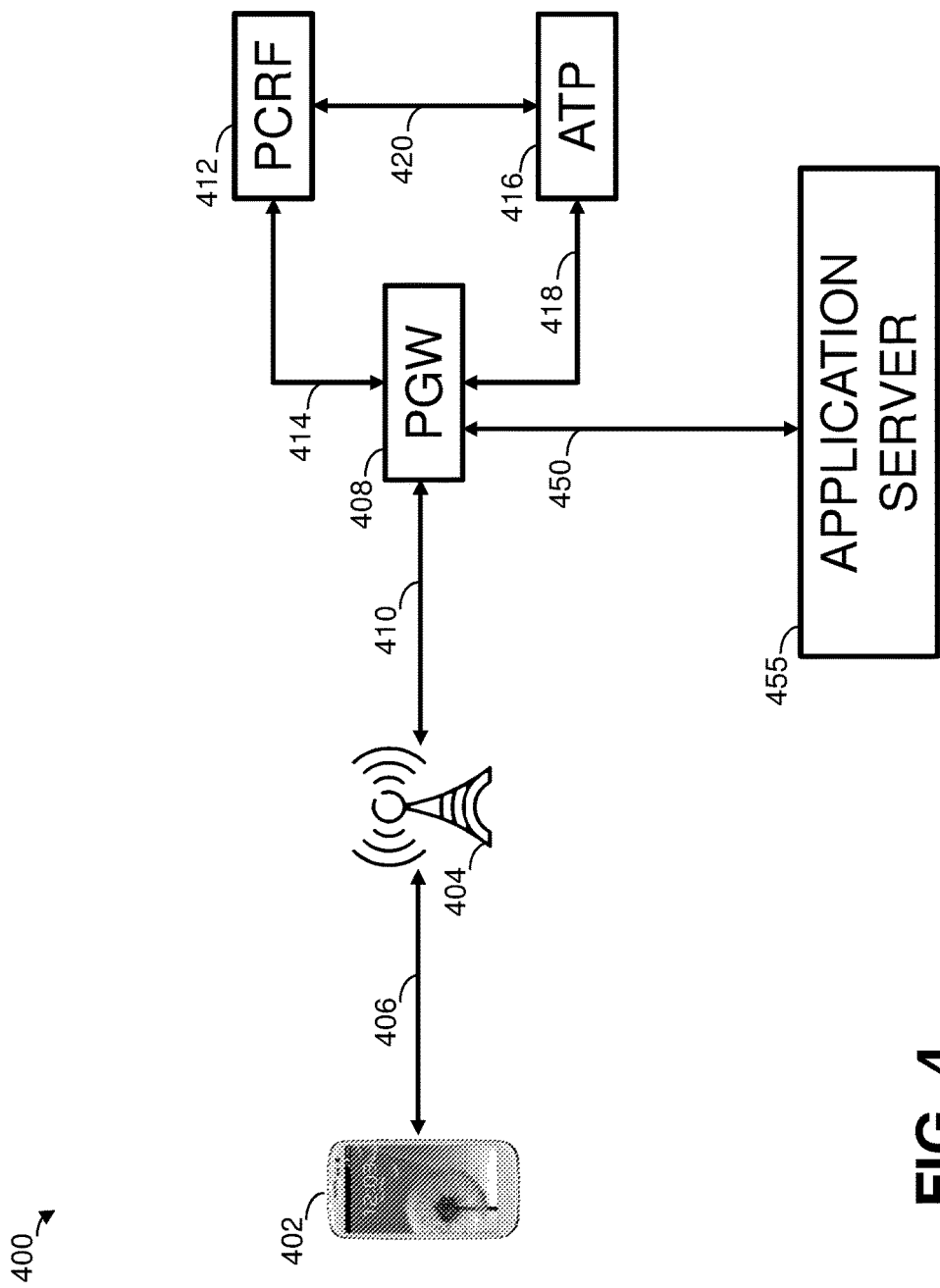
FIG. 4 illustrates a functional block diagram for an exemplary network architecture which can support application traffic pairing.

FIG. 4 illustrates a functional block diagram for an exemplary network architecture which can support application traffic pairing. The network 400 shown in FIG. 4 includes the components which assist in explaining certain aspects of the disclosure. The network 400 may include other elements and/or communication pathways which may be omitted from the simplified network shown in FIG. 4.

A wireless communication device 402 may include an application which communicates via a packet data network. An example of such an application is a weather application which retrieves updated weather information from a server hosted on the Internet. The wireless communication device 402 may establish a first communication path 406 with a base station 404. The base station 404 may then establish a second communication path 410 with a packet network gateway (PGW) 408. The packet network gateway 408 may serve as the entry point to the "core network." The packet network gateway 408 may establish a third communication path 450 with an application server 455. The application server 450 may be the weather server configured to provide updated weather information to the application running on the wireless communication device 402.

The packet network gateway 408 may be configured to obtain policy, charging, control and/or routing information from a policy control/charging rules function (PCRF) server 412. In the network 400 shown in FIG. 4 the information is provided via a fourth communication path 414. The fourth communication path 414 may include a Gx interface in some implementations.

The PCRF server 412 may provide, for example, quality of service information for the device and/or application traffic. For instance, if the subscription associated with the wireless communication device 402 includes unlimited, high bandwidth weather updates, the PCRF server 412 may provide this information to the packet network gateway 408. The packet network gateway 408 may enforce the unlimited aspect of the policy, but the bandwidth selection may be transmitted to the base station 404. The base station 404 may then control the bandwidth settings for the first communication path 406 and/or the second communication path 410 for the wireless communication device 402. The rules may be enforced only by the PGW 408, only by the base station 404, only by the wireless communication device 402, or any combination thereof.

As shown in FIG. 4, the packet network gateway 408 may also communicate with an application traffic pairing (ATP) server 416. The communication between the packet network gateway 408 and the ATP server 416 may be via a fifth communication path 418. The fifth communication path 418 may include one or more of a standard IP network connection and a Gx-like interface. The ATP server 416 may be configured to provide reporting rule(s) to the packet network gateway 408 for delivery to the wireless communication device 402. In some implementations, the ATP server 416 may provide reporting rules in a bulk transmission to the packet network gateway 408. The packet network gateway 408 may store the rules and determine which rules to deliver to the wireless communication device 402. The determination can be based on device type, application installation, time or other factor. In some implementations, the packet network gateway 408 may determine based on messaging between the packet network gateway 408 and the wireless communication device 402 that the wireless communication device 402 does not have up-to-date reporting rules. In such implementations, the packet network gateway 408 may request reporting rules for the wireless communication device 402 from the ATP server 416. In some implementations, the wireless communication device 402 may communicate with the ATP server 416 via the packet network gateway 408 to acquire the reporting rules.

The ATP server 416 may be further configured to communicate via a sixth communication pathway 420 with the PCRF server 412. For example, the ATP server 416 may obtain application identifiers which the network operator wants to monitor from the PCRF server 412. Some implementations of the sixth communication pathway 420 may be implemented in whole or in part using a standard IP network connection, an Rx-like interface, or an Sd-like interface.

Figure 5:
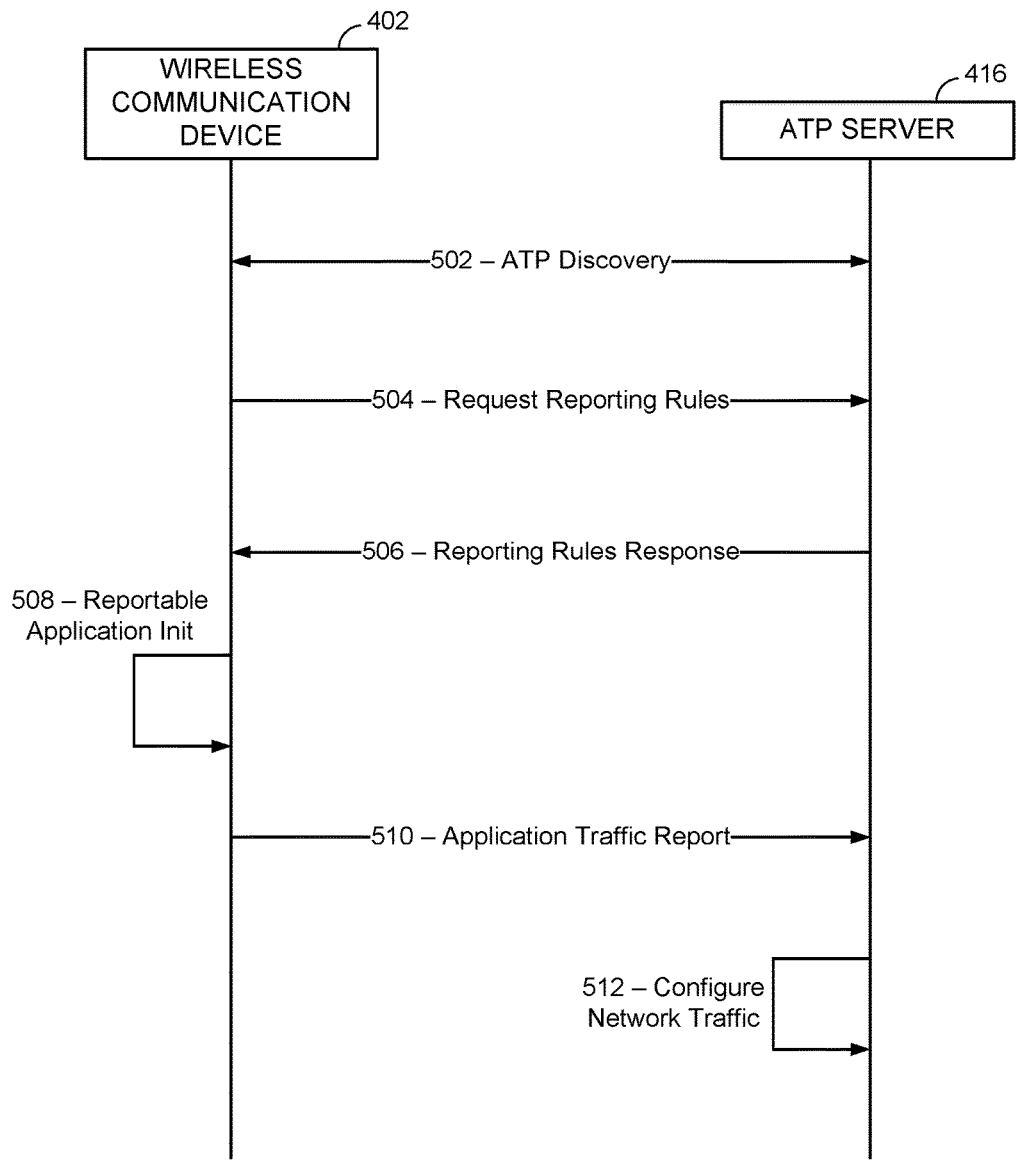
FIG. 5 shows a message flow diagram for application traffic pairing.

FIG. 5 shows a message flow diagram for application traffic pairing. The message flow diagram includes two entities, the wireless communication device 402 and the ATP server 416. It will be understood that the messages shown may flow through intermediate entities (e.g., the PGW 408, the base station 404, etc.) which have been omitted to enhance the clarity of the description of the message flow.

Messaging 502 is initiated by the wireless communication device 402 to discover the network location of the ATP server 416. The messaging 502 may include a DNS query, an IP address look up, or other network discovery processing.

Messaging 504 is initiated by the wireless communication device 402 to request application traffic reporting rules. The request may include one or more applications installed on the wireless communication device 402. The request, in some implementations, may be a general request for application traffic reporting rules without specifying any particular application(s).

Messaging 506 includes the reporting rules responsive to the request transmitted during the messaging 504. The messaging 506 may include one or more message transmissions to the wireless communication device 402 including the application traffic reporting rule(s). The rules may be specified in a variety of formats such as flat text, character delimited text, encrypted text, mark-up language (e.g., XML), or other message transmission formats. The wireless communication device 402 may store the reporting rules such as in memory or in a secure element. In some implementations, the wireless communication device 402 may further process the reporting rules such as to remove applications which are not installed on the wireless communication device 402, decrypt the reporting rules, compress the reporting rules, or reformat the reporting rules.

An application which is included in the reporting rules may be initialized via messaging 508. The initialization may include establishing a traffic flow, including a communication pathway, as described herein.

Messaging 510 may transmit the application traffic report in accordance with the application traffic reporting rules. The report may be formatted in a variety of formats such as flat text, character delimited text, encrypted text, mark-up language (e.g., XML), or other message transmission formats. The report may include information which identifies the instance of the application for the wireless communication device 402. One example of such information is a five-tuple including the source (e.g., wireless communication device 402) IP, destination IP, source port, destination port, and communication protocol (e.g., HTTP, HTTPS, FTP, SIP, SSH, a binary communication protocol, etc.).

Messaging 512 may then be utilized to configure the network traffic for the identified instance of the application for the wireless communication device 402. While the ATP server 416 is shown as configuring the network traffic, the ATP server 416 may be configured to transmit the identification information to the network entities such as the PCRF server 412, the packet network gateway 408, and/or the base station 404 for implementing the traffic configuration. Examples of the configuration for the network traffic include stopping traffic for this application, allowing traffic for this application, providing differentiated communication speed for this application, and applying Quality of Service for this application.

Some implementations may distribute policy and reporting over two or more servers. For example, one implementation may include a policy management server, from which the UE fetches the policy files, and a reporting management server, to which the UE reports what the network should do with the flow. It may be desirable, when reporting to the ATP server 416 (or reporting management server), a GGSN/PDN which is included in the communication path from the UE to the reporting destination may be configured to set one or more filters for an application that the UE reporting for. Such implementations avoid a delay which would otherwise be incurred if the reporting destination sends a request to the network about the application filters. Thus, in some implementations, the one or more of the messages shown (such as messaging 510 and/or 512) may be performed at the GGSN/PDN.

Figure 6:
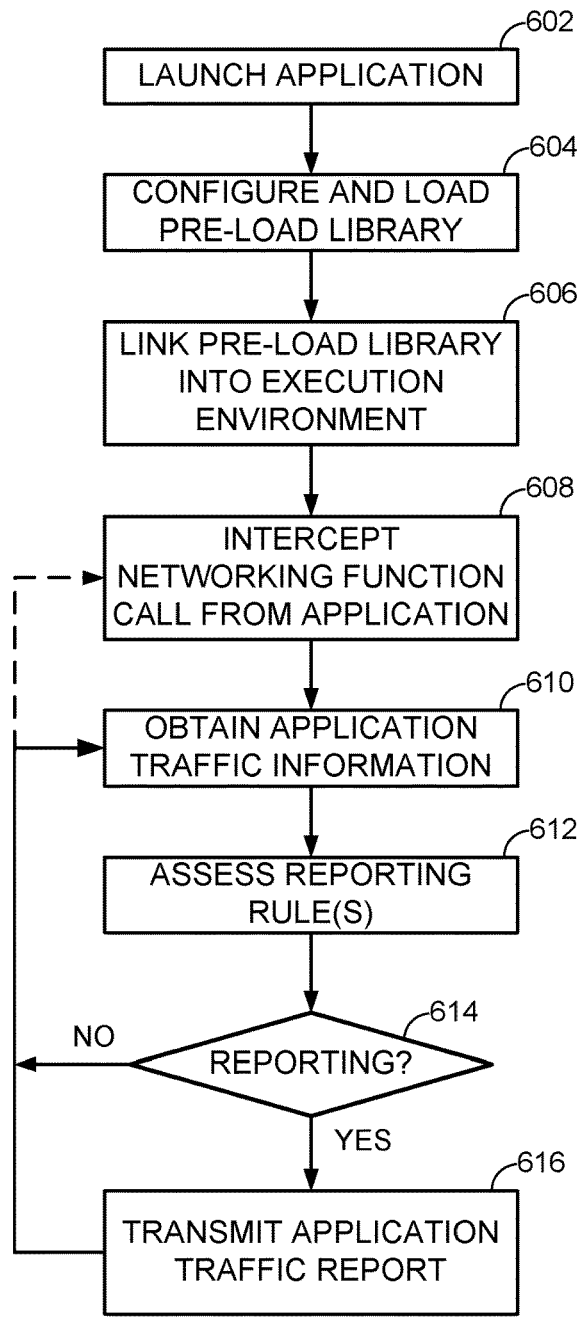
FIG. 6 shows a process flow diagram of an exemplary method of application traffic pairing.

FIG. 6 shows a process flow diagram of an exemplary method of application traffic pairing. For clarity, the process flow is described below with reference to the device 200 shown in FIG. 2. In one implementation, the processor 202 executes one or more sets of codes to control the functional elements of the device 200 to perform the functions described below.

At block 602, the processor 202 launches an application. The application may be a legacy or non-legacy application that is part of the application layer component 206. For example, the application may be a network browser that generates a networking function call to connect to a wireless network using a radio available at the TX/RX radio 212.

At block 604, the processor 202 configures and loads a pre-load library. For example, the pre-load library 218 includes a subset of the networking functions that are provided in the networking library 220 typically used by applications to assess communication networks. The networking functions in the pre-load library 218 are configured to intercept networking function calls from applications executing at a device. For example, the pre-load library 218 includes POSIX socket functions that may be used to intercept socket calls by applications executing at the device 200. In one implementation, the pre-load library 218 in stored in memory 204.

In one implementation, the pre-load library 218 functions are configured to receive arguments passed from calling applications. The arguments may be used to generate a request to the connectivity engine 208 to select the radio best suited for the application's purpose. The arguments may also be used to generate a request to the reporting engine 211 to determine what, if any, reporting rules exist for the application. In some implementations, the pre-load library 218 calls for application traffic pairing may be by-passed for certain applications which are not identifiable until a network connection is initiated or established.

At block 606, the processor 202 links the pre-load library into the execution environment. For example, the processor 202 links the pre-load library 218 into the execution environment at a higher priority than the networking library 220. Thus, networking functions calls by applications will be intercepted and processed by functions in the pre-load library 218 and not processed by similar functions in the networking library 220.

At block 608, the processor 202 intercepts a networking function call from the application. For example, the networking function call may be a POSIX socket function call, such as the Connect( ) function. The application generates the networking function call to connect to a radio to allow communication with external networks. Due to the linking of the pre-load library 218 into the execution environment at a higher priority than the networking library 220, the processor 202 intercepts (or processes) the networking function call via the functions in the pre-load library 218.

At block 610, the called function in the pre-load library 218 obtains the application traffic information for the instance of the application for the device. The application traffic information may be provided to the reporting engine 211.

At block 612, the reporting rule(s) are assessed. In one implementation, the reporting engine 211 operates to assess the reporting rule(s) described above. For example, the reporting engine 211 may communicate with the processor 202 to identify which reporting rules apply to the application and, in some implementations, what information is to be reported.

At decision block 614, a determination is made as to whether any reporting is needed for this application. Reporting may not be required if the application is not included in the reporting rule(s). Reporting may not be required if the reporting frequency for the application indicates it is not time to report. If no reporting is required, the process returns to block 610 to obtain traffic information. In some implementations, the traffic information for an application may change over time. In some implementations, the reporting rule(s) may be updated. Accordingly, it may be desirable to periodically obtain the traffic information and repeat the remainder of the process shown in FIG. 6. In some implementations, the process may return to block 608 to re-assess the reporting rule(s) based on application networking operations (e.g., connect, bind, disconnect, etc.).

Returning to decision block 614, if reporting is needed, at block 616 an application traffic report is transmitted to the network (e.g., the ATP server). The process may continue as described above by returning to block 608 or block 610.

Therefore, the process flow of FIG. 6 provides application traffic pairing through user equipment reporting for use with legacy and non-legacy applications. It should be noted that the process flow of FIG. 6 is just one implementation and that the operations of the process flow of FIG. 6 may be rearranged or otherwise modified such that other implementations are possible.

Figure 7:
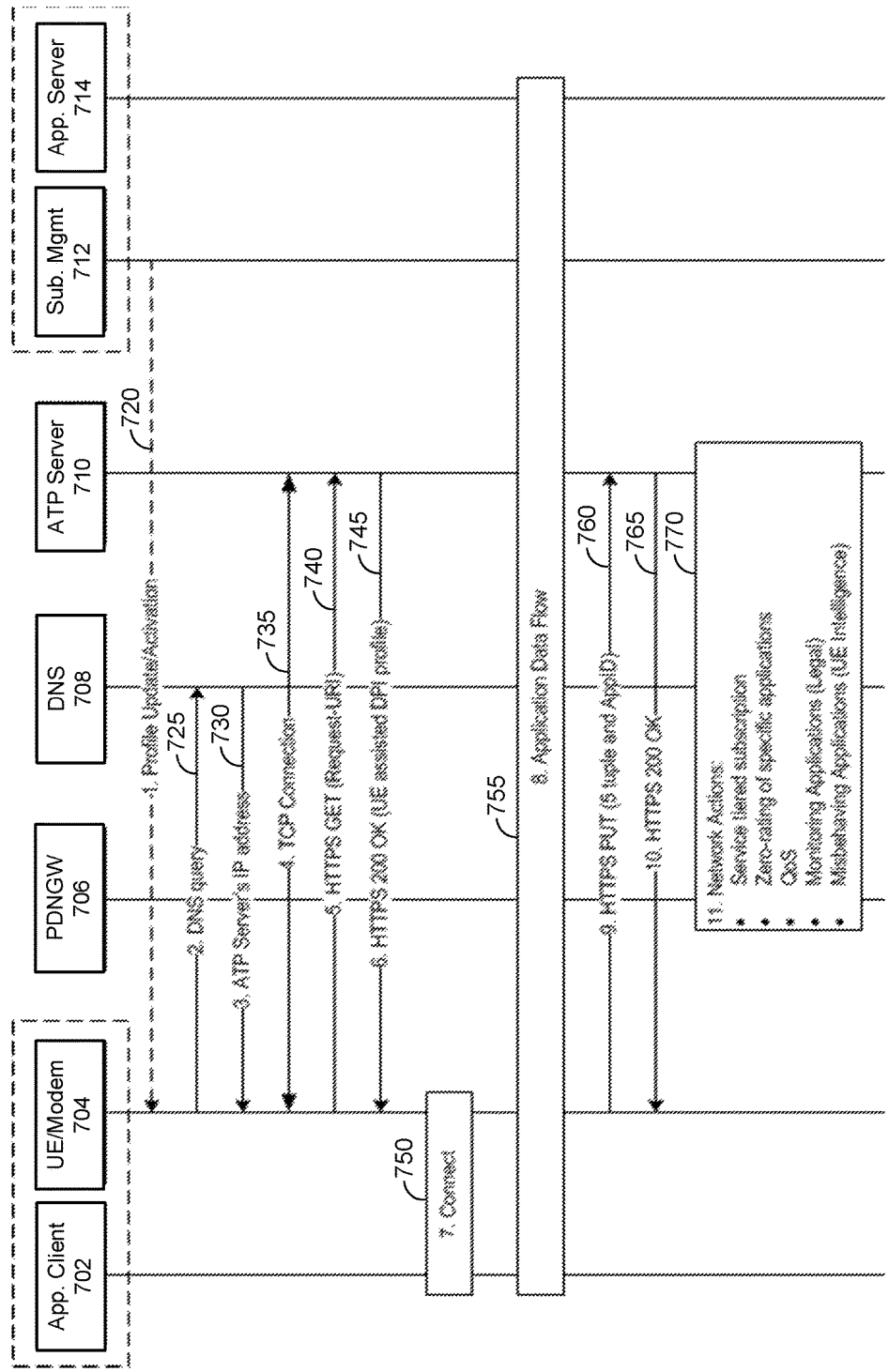
FIG. 7 shows a message flow diagram for initial application traffic pairing using HTTPS.

FIG. 7 shows a message flow diagram for initial application traffic pairing using HTTPS. The message flow shown in FIG. 7 is referred to as "initial" because it assumes that an application client 702 is installed on a user equipment (UE) 704. However, the UE 704 may not have yet obtained or provided any application traffic information. This may be the situation where the application client 702 is newly installed, where the UE 704 is powered on, or where the UE 704 is involved in handoff from one network to another.

In addition to the application client 702 and the UE 704, the message flow diagram of FIG. 7 illustrates a packet data network gateway (PDNGW) 706, a domain name server 708, an ATP server 710, an operator subscription management system 712, and an application server 714. It will be understood that the messages shown may flow through intermediate entities which have been omitted to enhance the clarity of the description of the message flow. Furthermore, it will be understood that some entities may be shown as separate entities in FIG. 7 may be combined in a single entity.

Message 720 may be transmitted from the operator subscriber management system 712 to provide an initial application traffic pairing profile (e.g., reporting rules) to the UE 704. In some implementations, the pairing profile may be included on the UE 704 by the manufacturer or included when the application client 702 is installed. The pairing profile may be provided through wireless messages received from the operator network, stored in a memory or secure element on the UE 704, or other provisioning processes.

Message 725 is transmitted from the UE 704 to the domain name server 708 to obtain a network address for the ATP server 710. Message 730 includes an address for the ATP server 710. As shown in FIG. 7, the address is an IP address. Using the received IP address the UE 704 establishes a TCP connection with the ATP server 710 via message 735. One the connection is established, the UE 704 may construct an HTTPS GET request message 740 including a request-URI to get profile data. One example request is shown below in Listing 1.

| LISTING 1 |
|---|
| GET /TheProfile.html HTTP1.1<br>Host: www.operator.com |

Via message 745, the ATP server 710 transmits an HTTPS 200 OK response with application traffic pairing profile (e.g., reporting rules). In some implementations, the profile documents are transmitted in an XML format. An example response header for XML formatted profile is shown in Listing 2.

| LISTING 2 |
|---|
| HTTP1.1 200 OK<br>Content-Type: text/xml; charset=utf-8<br>Content-Length: 2934 |

At this point, the UE 704 has received the reporting rules. Sometime thereafter, the application client 702 connect to the network. The application client 702 first transmit a connect request message 750 to the UE 704 to obtain a communication channel. One obtained, the application client 702 communicates with the application server 714 through message(s) 755. As shown in FIG. 7, the message(s) 755 exchanged between the application client 702 and the application server 714 may be referred to as an application data flow.

Based on the reporting rules, the UE 704 may determine a report is due for the application client 702. Message 760 is transmitted from the UE 704 to the ATP server 710. As shown in FIG. 7, the message 760 includes a five tuple and an identifier for the application client ("AppID"). As shown in FIG. 7, the message 760 is an HTTPS PUT message. An example of the message 760 is shown below in Listing 3. In some implementations, a simple binary communication protocol may be used. In such embodiments, the message 760 is a binary message.

| LISTING 3 |
|---|
| HTTP/1.1 PUT /AppData<br>111.111.111.111;80;222.222.222.222;80;HTTP;<br>vCF7qAqX4hGh84jEYYhwmw= = |

The application traffic report shown in Listing 3 is specified using a character delimited list. The fields may be fixed length or otherwise represented in a machine readable format. The example application traffic report shown in Listing 3 is annotated in Table 2 below.

TABLE 2

| Logical Name | Value |
|---|---|
| Source IP Address | 111.111.111.111 |
| Source Port | 80 |
| Destination IP Address | 222.222.222.222 |
| Destination Port | 80 |
| Protocol | HTTP |
| Application Identifier<br>(Base-64 Encoded) | vCF7qAqX4hGh84jEYYhwmw= = |

The values, delimiter, and/or order of fields may be specified in other fashions. The order, values, and delimiter used in this example is provided as one illustration of a possible message format. In some implementations, wildcard characters may be used to specify a range of values. For example, the destination IP address may be specified using 222.222.222.* to indicate all addresses beginning with "222.222.222." are associated with this application client.

As describe thus far, the request URI is for a single application reporting rule. In some implementations, the message 760 may include multiple rules. For example, the request URI may be associated with a particular device profile and the rules included in the message 760 may be selected based on the device profile. The request URI may be associated with a suite of applications (e.g., from a software provider, network operator, etc.). The multiple rules may be included in the message 760 as line delimited, character delimited, marked up (e.g., XML, HTML), fix-field length text or in another suitable machine readable format. In some implementations, the message 760 may be compressed and/or encrypted.

Those of skill in the art would understand that information and signals may be represented using any of a variety of different technologies and techniques. For example, data, instructions, commands, information, messages, signals, bits, symbols, and chips that may be referenced throughout the above description may be represented by voltages, currents, electromagnetic waves, magnetic fields or particles, optical fields or particles, or any combination thereof.

In response to the message 760, an acknowledgment message 765 may be transmitted from the ATP server 710 to the UE 704. As shown in FIG. 7, the message 765 is a HTTPS 200 OK message.

Messages 770 may be transmitted between and/or amongst the PDNGW, the DNS, and the ATP server to allow the network operator control over the network utilization for the application client 702. Examples of network actions include service tiered subscription, zero-rating of specific applications (e.g., deny service to application clients identified as spam, malware, or too resource intensive for the network), applying Quality of Service (QoS), complying with legally enforced monitoring requirements, and identifying misbehaving applications (e.g., statistics collection on communication patterns for application clients).

While the message flow shown in FIG. 7 includes messaging via HTTPS, it will be understood that other application layer communication protocols may be used to implement the application traffic pairing messages shown. Such alternative protocols include HTTP, SIP, FTP, TCP, SSH, remote procedure call (RPC), socket secure (SOCKS), and the like.

Figure 8:
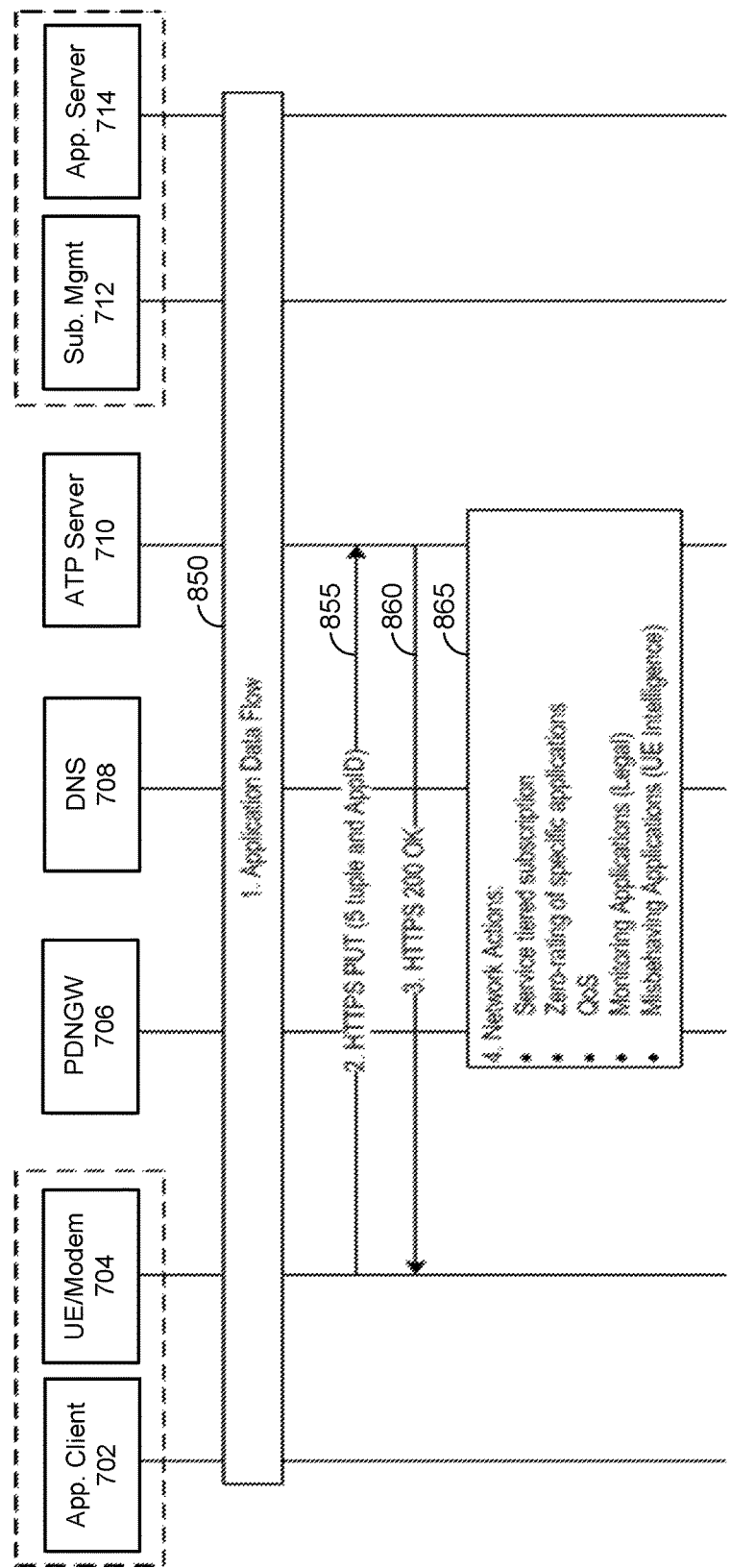
FIG. 8 shows a message flow diagram for re-reporting application traffic pairing using HTTPS.

FIG. 8 shows a message flow diagram for re-reporting application traffic pairing using HTTPS. The message flow shown in FIG. 8 is referred to as "re-reporting" because it assumes that an application client 702 has transmitted at least one prior traffic report, such as is shown in FIG. 7. The entities shown in FIG. 8 are the same as those in FIG. 7. As with the flow shown in FIG. 7, it will be understood that the messages shown in FIG. 8 may flow through intermediate entities which have been omitted to enhance the clarity of the description of the message flow. Furthermore, it will be understood that some entities may be shown as separate entities in FIG. 8 may be combined in a single entity.

The application client 702 may be exchanging messages (e.g., application data flow) with the application server 714. One message 850 may indicate the application client 702 or the application server 714 is changing connection information. For example, the application server 714 may undergo a system wide load change which necessitates moving the server instance for the application client 702 to a different IP address. In such a case, the UE 702 may transmit a message 855 to the ATP server 710 to indicate the update. In some implementations, the message 855 may include the entire report for the application (e.g., 5-tuple and application client identifier). Such a message would look similar to that shown in Listing 3 above. In some implementations, the message 855 may include a report of all the application clients for the UE 704. In some implementations, the message 855 may include only the information which is being updated (e.g., destination IP address) for an application client. The ATP server 710 may transmit an acknowledgement message 860 to the UE 704. As shown in FIG. 8, the acknowledgment message 860 is an HTTPS 200 OK message. Messages 865 may be transmitted between and/or amongst the PDNGW, the DNS, and the ATP server to allow the network operator control over the network utilization for the application client 702, similar to the messages 770 described above.

While the message flow shown in FIG. 8 includes messaging via HTTPS, it will be understood that other application layer communication protocols may be used to implement the application traffic pairing messages shown. Such alternative protocols include HTTP, SIP, FTP, TCP, SSH, RPC, SOCKS, and the like.

Figure 9:
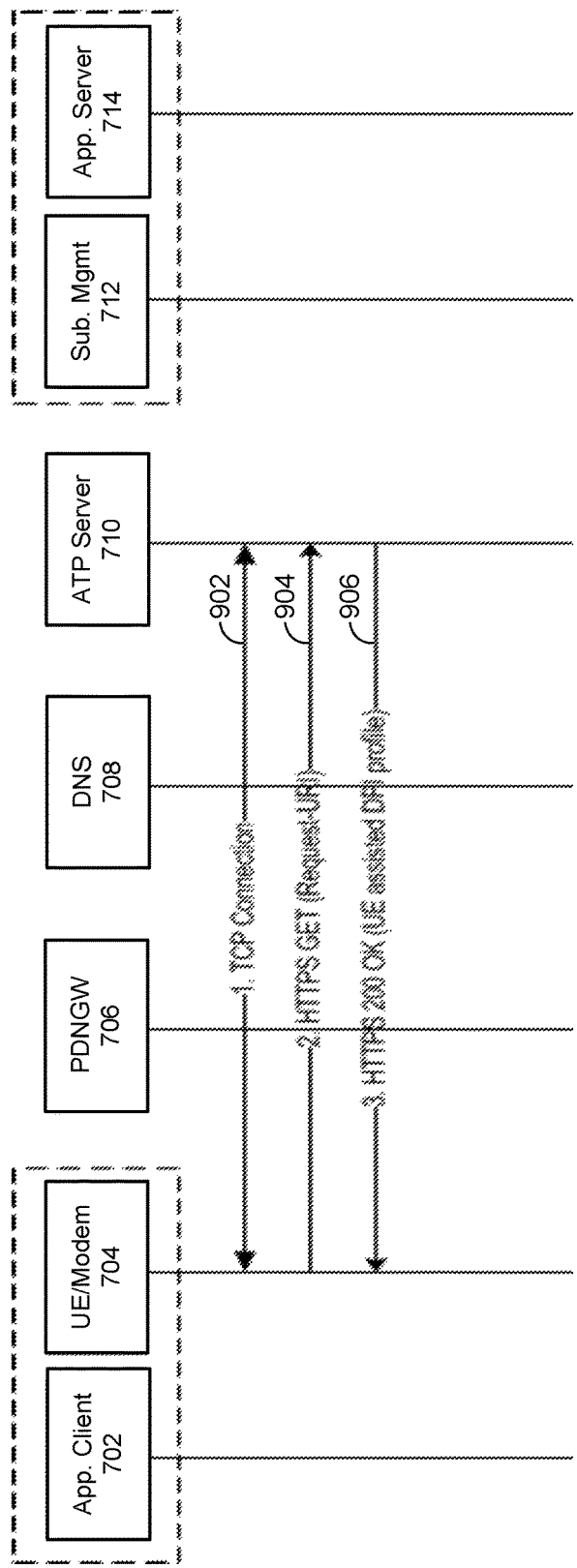
FIG. 9 shows a message flow diagram for a method of updating application traffic pairing reporting rules using HTTPS.

FIG. 9 shows a message flow diagram for a method of updating application traffic pairing reporting rules using HTTPS. The message flow shown in FIG. 9 may be implemented to provide a full or incremental update to the reporting rules to the UE 704. As shown in FIG. 9, the UE 704 fetches the reporting rules from the ATP server 710. The entities shown in FIG. 9 are the same as those in FIG. 7. As with the flow shown in FIG. 7, it will be understood that the messages shown in FIG. 9 may flow through intermediate entities which have been omitted to enhance the clarity of the description of the message flow. Furthermore, it will be understood that some entities may be shown as separate entities in FIG. 9 may be combined in a single entity.

Via message 902, the UE 704 establishes a communication path with the ATP server 710. As shown, the communication path established is a TCP connection. Once a communication path is established with the ATP server 710, message 904 is transmitted from the UE 704 to the ATP server 710. As shown, the message 904 is an HTTPS GET message. The message 904 may be similar to the message shown in Listing 1 above. In response, the ATP server 710 will generate the routing rules for the requested URI. The routing rules are included in a message 906 which is transmitted to the UE 704. The message 906 may be formatted similar to the message shown and described above in reference to Listing 2.

Figure 10:
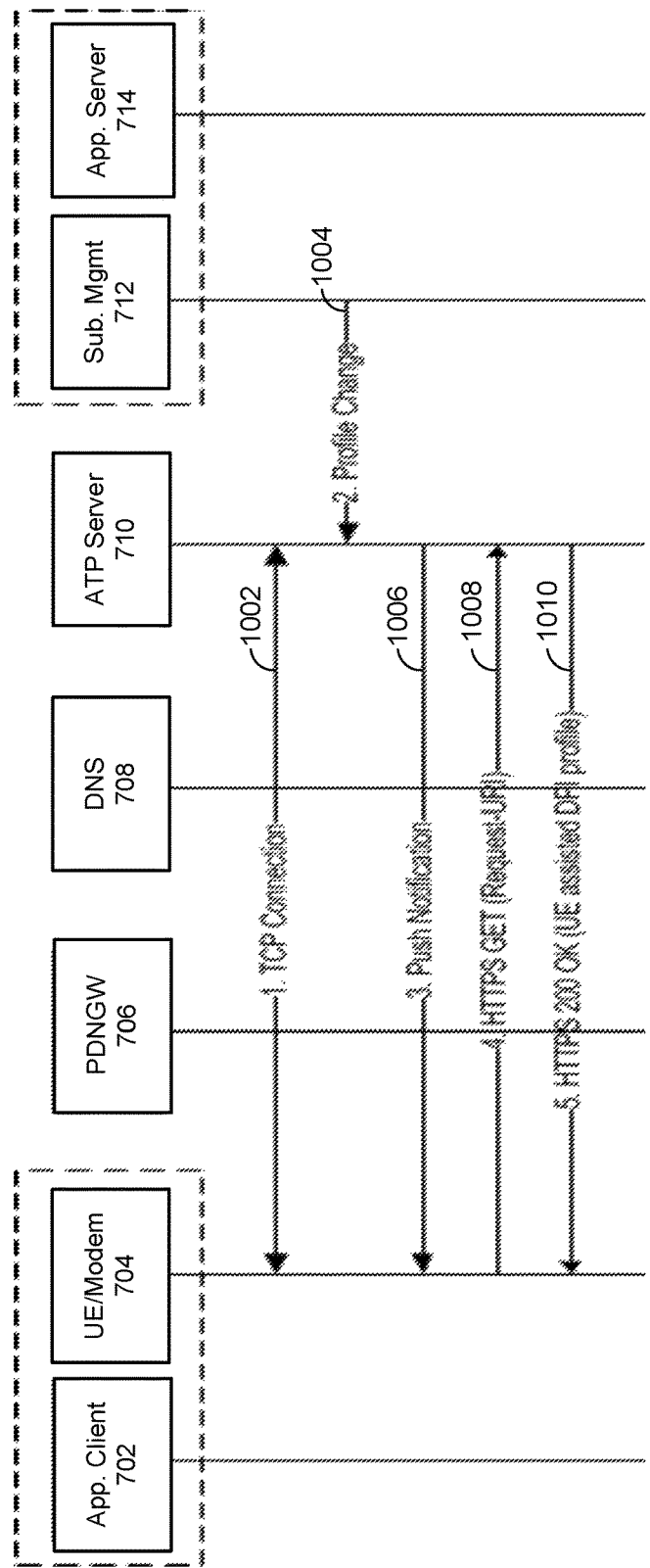
FIG. 10 shows a message flow diagram for another method of updating application traffic pairing reporting rules using HTTPS.

FIG. 10 shows a message flow diagram for another method of updating application traffic pairing reporting rules using HTTPS. Where the flow in FIG. 9 was UE initiated, the flow in FIG. 10 may be ATP server 710 and/or operator subscription management system 712 initiated.

The entities shown in FIG. 10 are the same as those in FIG. 7. As with the flow shown in FIG. 7, it will be understood that the messages shown in FIG. 10 may flow through intermediate entities which have been omitted to enhance the clarity of the description of the message flow. Furthermore, it will be understood that some entities may be shown as separate entities in FIG. 10 may be combined in a single entity.

Via message 1002, a communication path is established between the UE 704 the ATP server 710. As shown, the communication path established is a TCP connection. This communication path may be established in response to an "initial" reporting or other communication processing between the UE 704 and the ATP server 710. The communication path may be initiated by either the UE 704 or the ATP server 710.

While the connection is established, the operator subscription management system 712 may transmit a reporting profile change message 1004 to the ATP server 710. The message 1004 may include updated reporting profile information and/or new reporting profile information. A message 1006 is sent from the ATP server 710 to the UE 704 indicating the change in reporting profile. The message shown is a push notification. Via message 1008 and message 1010, the UE 704 requests and receives the updated reporting profile information similar to message 904 and message 906 above. Accordingly, the network has caused the UE 704 to obtain the reporting profile information.

Figure 11:
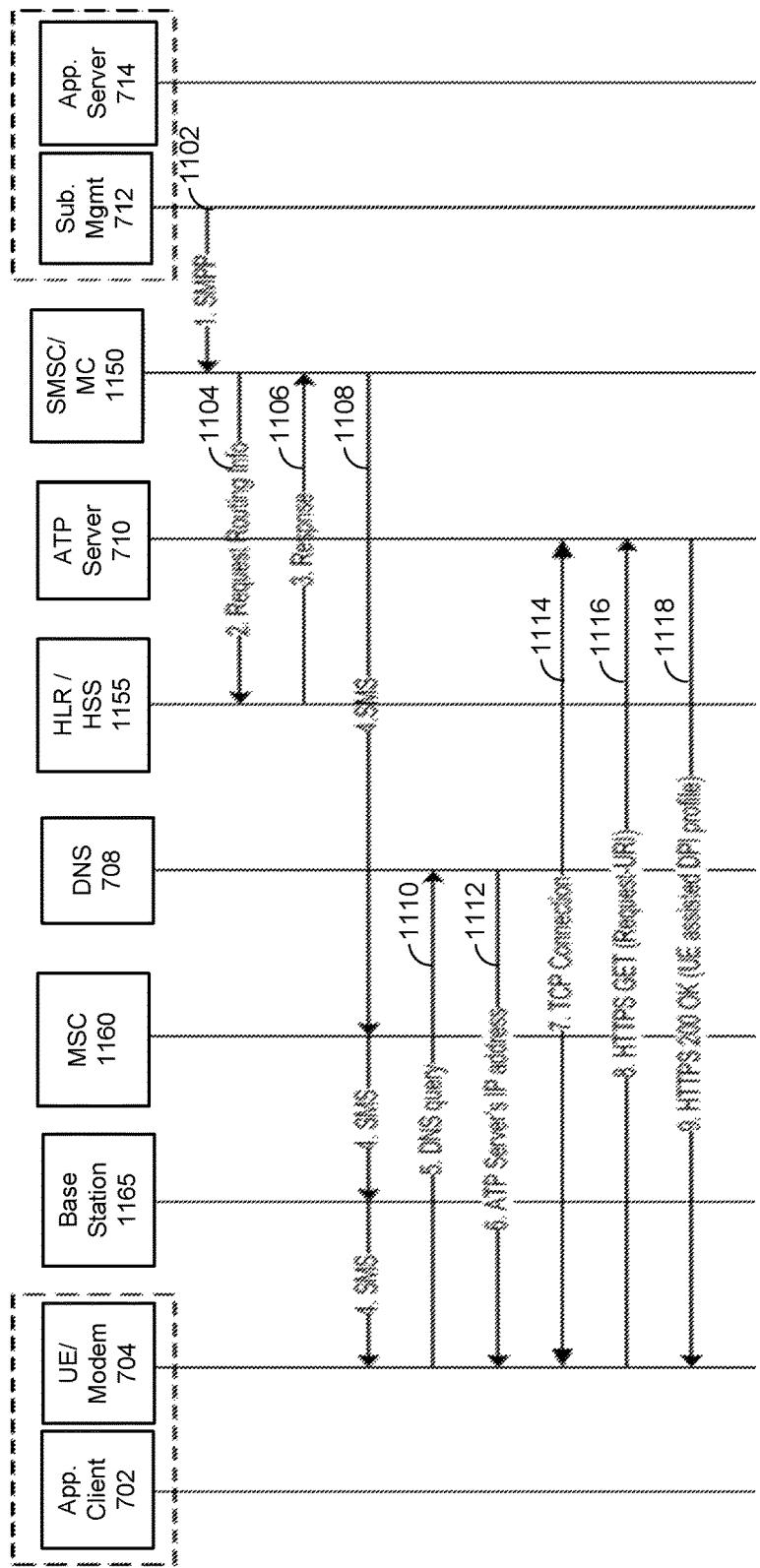
FIG. 11 shows a message flow diagram for another method of updating application traffic pairing reporting rules using short messaging service (SMS) and HTTPS.

FIG. 11 shows a message flow diagram for another method of updating application traffic pairing reporting rules using short messaging service (SMS) and HTTPS. It may be desirable for some operator subscription management systems to communicate reporting rules via short messaging service. This can provide one benefit such as ease of integration where existing SMS communication pathways exist for the operator subscription management system. Furthermore, a user equipment may be camped on a circuit switched network and lacking an established packet network connection. One such example may be a machine-to-machine device such as a smartmeter. Through the message flow in FIG. 11, the device may be alerted to the presence of a new application traffic pairing rule(s), and institute the acquisition of the same.

The entities shown in FIG. 11 include those in FIG. 7. FIG. 11 also includes a short message service center (SMSC)/message center (MC) server 1150, a home location register/home subscriber server (HLR/HSS) 1155, a message service center (MSC) 1160, and a base station 1165. As with the flow shown in FIG. 7, it will be understood that the messages shown in FIG. 11 may flow through intermediate entities which have been omitted to enhance the clarity of the description of the message flow. Furthermore, it will be understood that some entities may be shown as separate entities in FIG. 11 may be combined in a single entity.

The operator subscription management system 712 transmits a message 1102 to the SMSC/MC server 1150. The message 1102 shown includes a short message peer-to-peer (SMPP) message including the application traffic pairing reporting profile information. Via message 1104, the SMSC/MC server 1150 requests the network address of the UE 704 from the HLR/HSS server 1155. Message 1106 includes the network address information for the UE 704. Using the obtained network address information, the SMSC/MC server 1150 transmits a message 1108 to the UE 704. The message 1108 may be a forwarded copy of the message 1102. The message 1108 may be forwarded to the UE 704 via the MSC 1160 and/or the base station 1165. In some implementations, by use of destination port information included in the user data of the message 1108, the UE 704 can determine that the message 1108 is configuration SMS. In some implementations, if the UE 704 is a 3GPP2-capable device, the teleservice information may be set to WEMT (e.g., a 3GPP format). Other methods of identifying the message 1108 as configuration may be implemented without departing from the scope of the disclosure.

The remaining messages (e.g., message 1110, message 1112, message 1114, message 1116, and message 1118) are transmitted to discover the ATP server 710 and obtain the routing rules. These messages are similar to messages 725, 730, 735, 740, and 745 described above in reference to FIG. 7. In some implementations, the ATP server (or the policy management functions related thereto) may have been previously discovered. In such implementations, messages 1110 and 1112 may be omitted. In implementations where the SMS contains the fully qualified domain name of the ATP server (or the policy management server associated therewith), messages 1110 and 1112 may be included to provide discovery of the qualified server.

The application reporting rules may also enable the use of a connectivity server. The connectivity server may be used to offer applications and/or connectivity packages for wireless communication devices. For example, the connectivity server may include a video application along with two connectivity options such as unlimited or per-byte pricing. Other connectivity options may include Quality of Service options, time or duration of access (e.g., nights-and-weekends or 2 hours), and the like.

Figure 12:
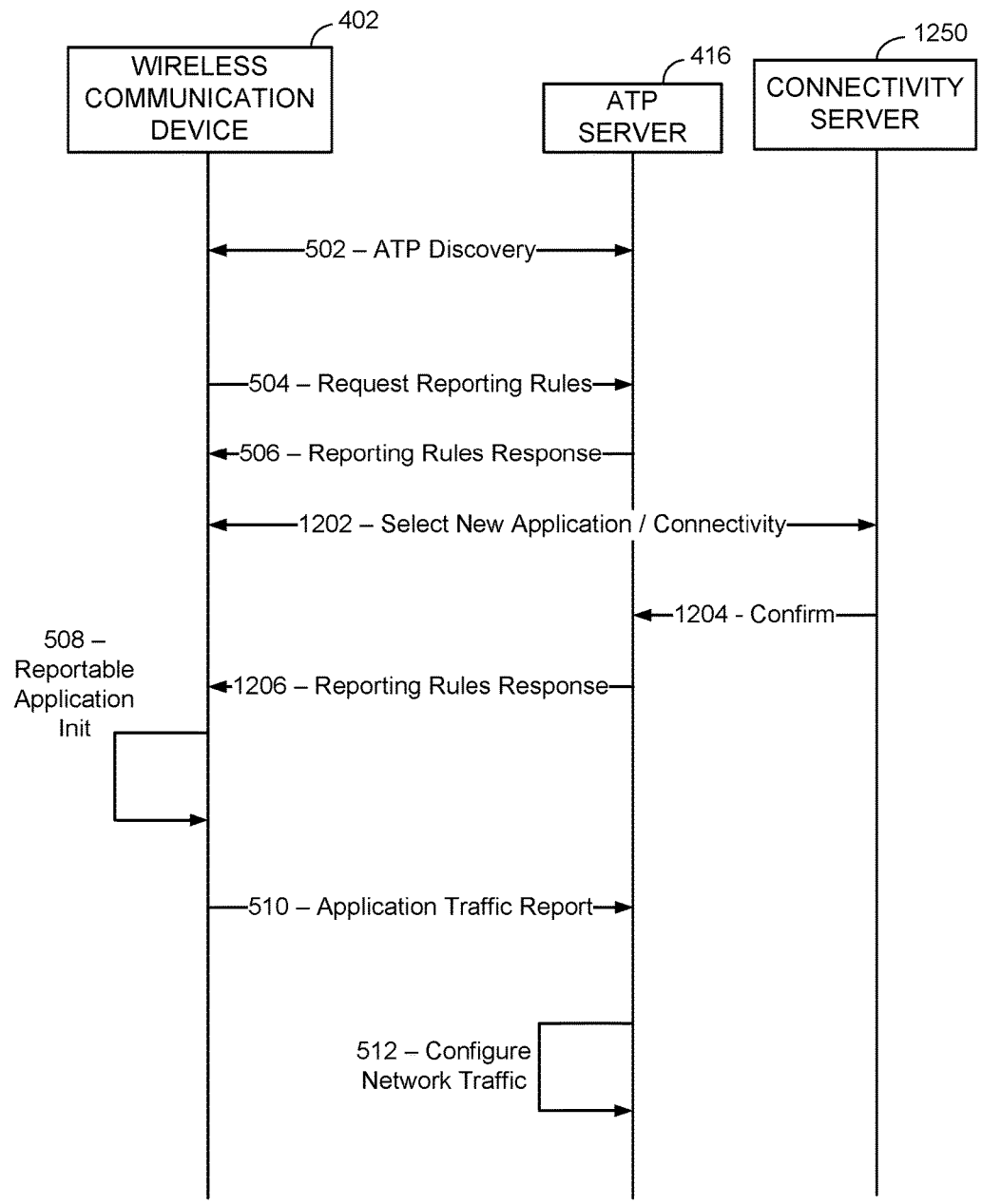
FIG. 12 illustrates a message flow diagram for an example method of connectivity provisioning.

FIG. 12 illustrates a message flow diagram for an example method of connectivity provisioning. The message flow is similar to that shown in FIG. 5. The message flow may begin with the message 502, the message 504, and the message 506 as described above. Message 1202 may be transmitted between the wireless communication device 402 and the connectivity server 1250. The message 1202 may include a list of available applications and/or connectivity options. The wireless communication device 420 may be configured to present these options and receive a selection for an application/connectivity package. The wireless communication device 402 may also be configured to receive payment information or billing authorization (e.g., charge my wireless account) for the selected package. Message 1204 is transmitted from the connectivity server 1250 to the ATP server 416 to confirm the selection for the wireless communication device 402. The ATP server 416 may then update the reporting rule as described above via message 1206. The remaining messages shown in FIG. 12 are similar to those described above in FIG. 5.

Figure 13:
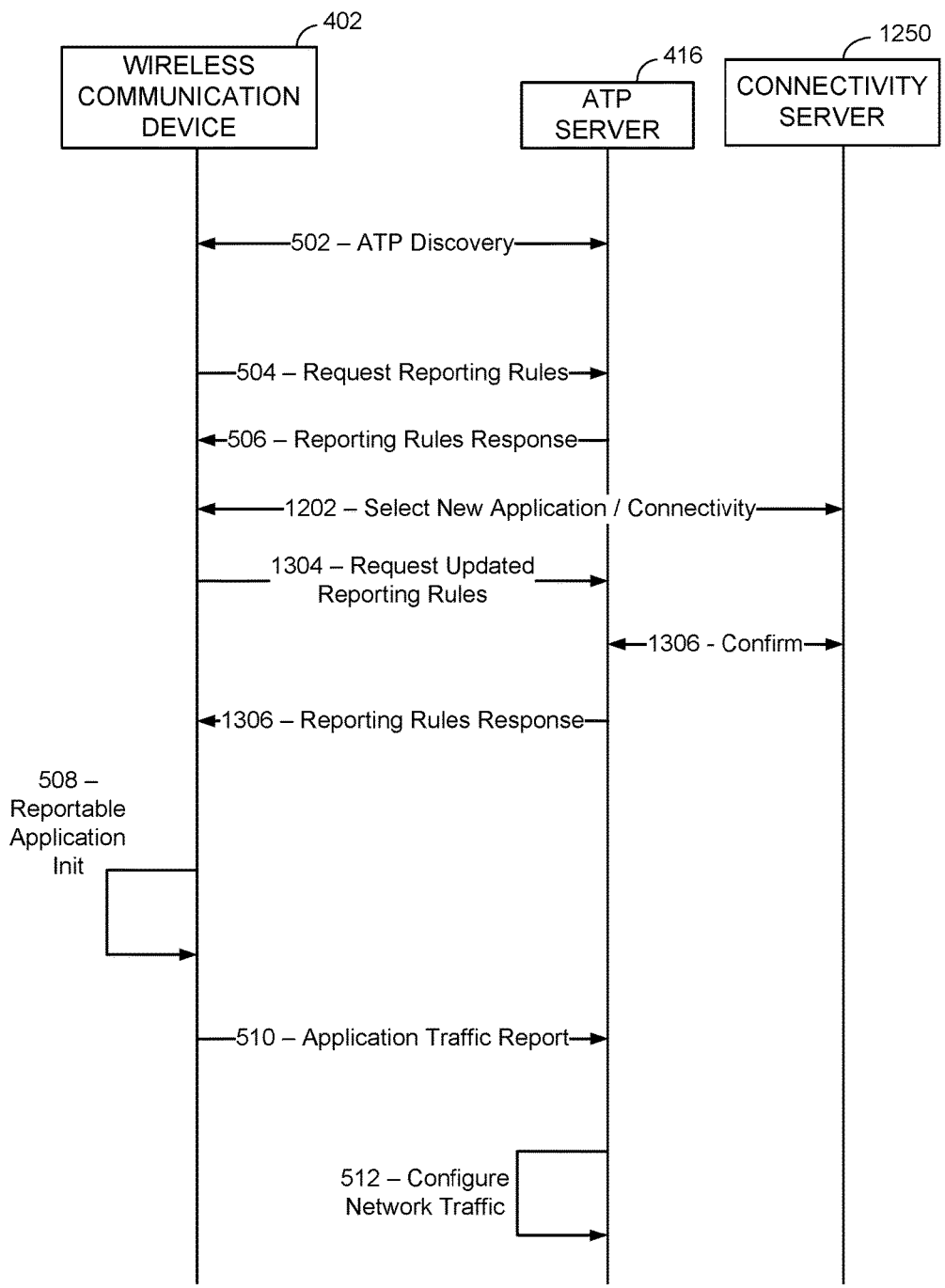
FIG. 13 illustrates a message flow diagram for another example method of connectivity provisioning.

FIG. 13 illustrates a message flow diagram for another example method of connectivity provisioning. The message flow is similar to that shown in FIG. 12. However, where in FIG. 12 the network pushed the connectivity information to the wireless communication device, FIG. 13 illustrates how the wireless communication device may request the updated profile information.

The flow begins similarly to FIG. 5 and FIG. 12 with messages 502, 504, and 506. The flow in FIG. 13 also include message 1202 as described above in FIG. 12. Once a connectivity package is selected, the wireless communication device 402 transmits a request message 1304 for updated reporting rules to the ATP server 416. The request may include information identifying the wireless communication device 402 such as a subscription identifier for the connectivity package. The ATP server 416 may obtain and confirm the reporting rules for the wireless communication device 402 from the connectivity server 1250. Based on the received reporting rules, the ATP server 416 may generate and transmit a reporting rules response message 1306 to the wireless communication device 402. The remaining messages shown in FIG. 13 are similar to those described above in FIG. 5.

Figure 14:
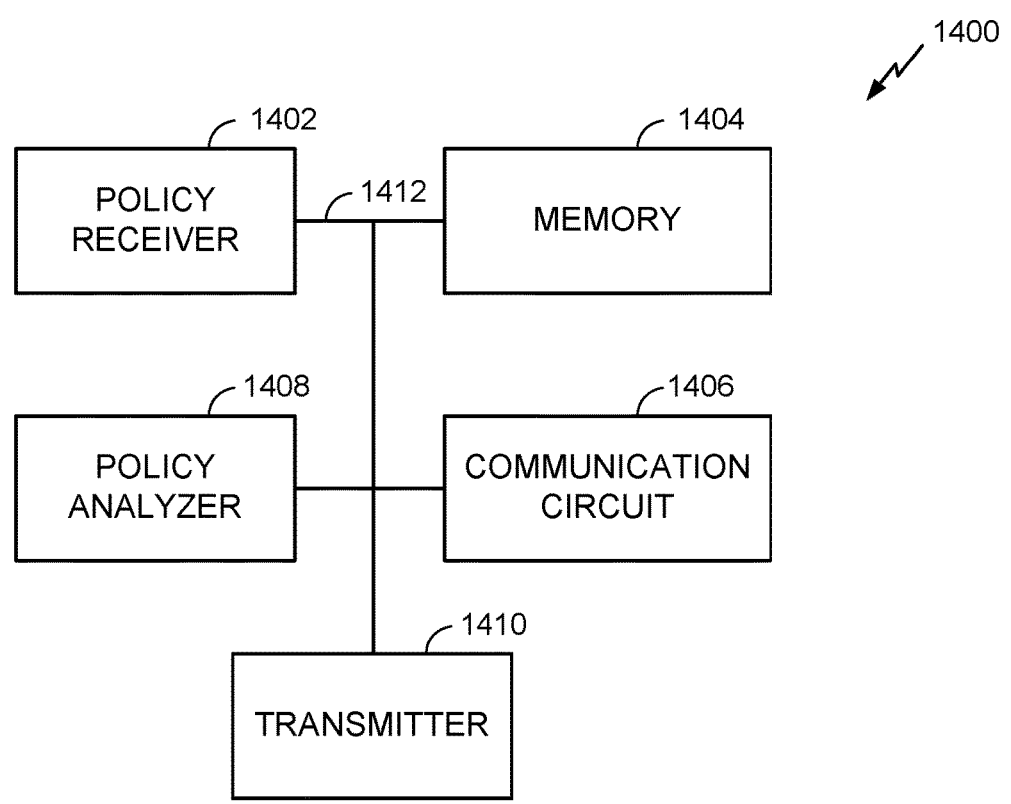
FIG. 14 illustrates a functional block diagram for an example of a device for network communication including application traffic pairing.

FIG. 14 illustrates a functional block diagram for an example of a device 1400 for network communication including application traffic pairing. The device 1400 shown is a simplified illustration including several components which help illustrate the features described herein. It will be understood that the device 1400 may include other elements and/or configure the elements shown in alternative or additional ways to achieve other functions.

The device 1400 includes a policy receiver 1402. The policy receiver 1402 is configured to receive policy information including one or more application identifiers for traffic flow reporting. The policy receiver 1402 may include one or more of an antenna, a receiver, a transceiver, a signal processor, a processor, and a memory. In some implementations, means for receiving policy information may include the policy receiver 1402.

The device 1400 further includes a memory 1404. The memory 1404 is configured to store the received policy information. The memory 1404 may be implemented using one or more of a static memory, RAM, ROM, optical memory, memory drive, network storage, a secure element, and a processor. In some implementations, means for storing include the memory 1404.

The device 1400 further includes a communication circuit 1406. The communication circuit 1406 is configured to initiate, maintain, and monitor a connection for an application executed by a processor. The communication circuit 1406 may include a modem, a network interface, a signal processor, a transceiver, an amplifier, and a processor. Means for identifying a network operation for an application may include the communication circuit 1406.

The device 1400 also includes a policy analyzer 1408. The policy analyzer 1408 is configured to compare an application identifier for the application to the one or more application identifiers included in the policy information. The policy analyzer 1408 may include a processor, a memory, a comparator, a clock, and a memory. Means for comparing an application identifier for the application to the one or more application identifiers included in the policy information may include the policy analyzer 1408.

The device 1400 shown includes a transmitter 1410. The transmitter 1410 is configured to transmit, when the application is included in the policy information, a traffic descriptor and one of the application identifiers for the application. The traffic descriptor and the one of the application identifiers uniquely identify a traffic flow for the application. The transmitter 1410 may include an antenna, a signal generator, an amplifier, a processor, and a memory.

The elements of the device 1400 may exchange information via a bus 1412. In some implementations, the bus 1412 may also be used to exchange power.

Figure 15:
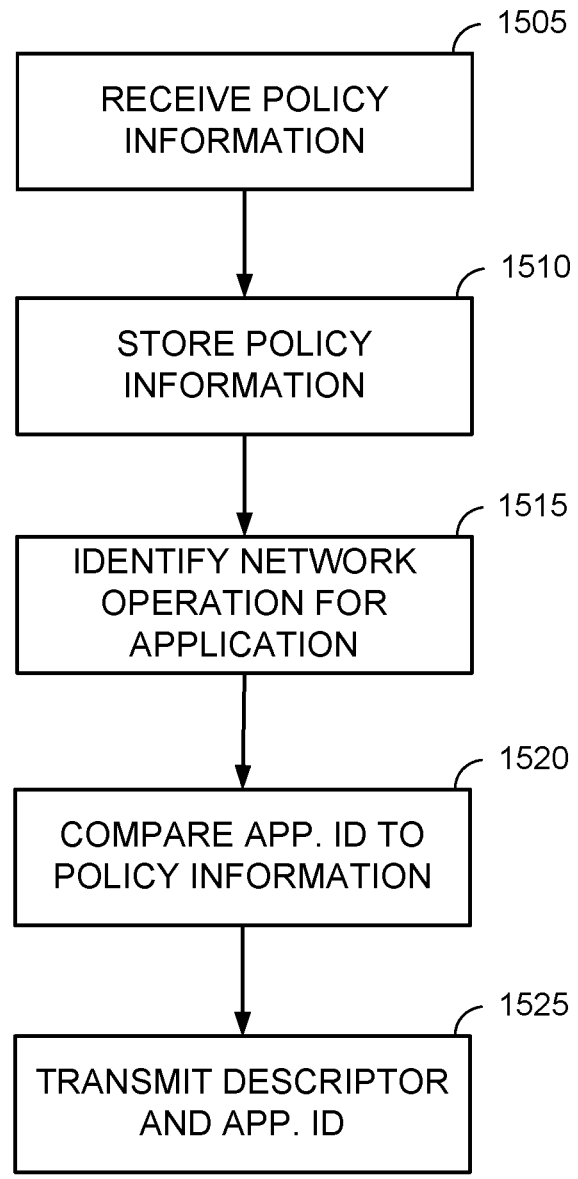
FIG. 15 illustrates a process flow diagram for an example of a method of network communication including application traffic pairing.

FIG. 15 illustrates a process flow diagram for an example of a method of network communication including application traffic pairing. The method shown in FIG. 15 may be implemented in one or more of the devices shown and described above such as that in FIGS. 1, 2, 3, and 14. At node 1505, policy information including one or more application identifiers for traffic flow reporting is received. At node 1510, the received policy information is stored. At node 1515, a network operation for an application is identified. At node 1520, an application identifier for the application is compared to the one or more application identifiers included in the policy information. At node 1525, when the application is included in the policy information, a traffic descriptor and one of the application identifiers for the application are transmitted, the traffic descriptor and the one of the application identifiers uniquely identifying a traffic flow for the application.

Figure 16:
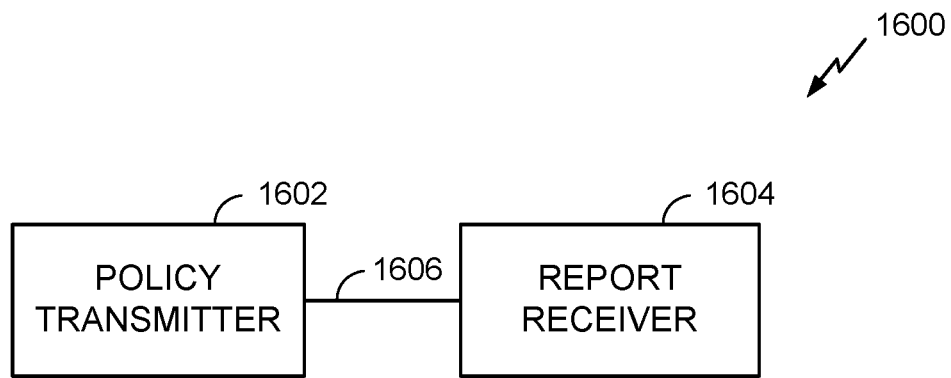
FIG. 16 illustrates a functional block diagram for an example of another device for network communication including application traffic pairing.

FIG. 16 illustrates a functional block diagram for an example of another device for network communication including application traffic pairing. The device 1600 shown is a simplified illustration including several components which help illustrate the features described herein. It will be understood that the device 1600 may include other elements and/or configure the elements shown in alternative or additional ways to achieve other functions.

The device 1600 includes a policy transmitter 1602. The policy transmitter 1602 is configured to transmit policy information for one or more applications. The policy information transmitted may include one or more application identifiers for traffic flow reporting. The policy transmitter 1602 may include one or more of an antenna, a transmitter, a power source, a signal generator, a network interface, a memory, and a processor. Means for transmitting policy information may include the policy transmitter 1602.

The device 1600 also includes a report receiver 1604. The report receiver 1604 is configured to receive a traffic descriptor and one of the application identifiers for an application of the one or more applications, the traffic descriptor and the one of the application identifiers uniquely identifying a traffic flow for the application. The report receiver 1604 may be implemented using one or more of an antenna, a signal processor, a receiver, a memory, a network interface, a processor, and a comparator. Means for receiving a traffic descriptor and one of the application identifiers may include the report receiver 1604.

The elements of the device 1600 may exchange information via a bus 1606. In some implementations, the bus 1606 may also be used to exchange power.

Figure 17:
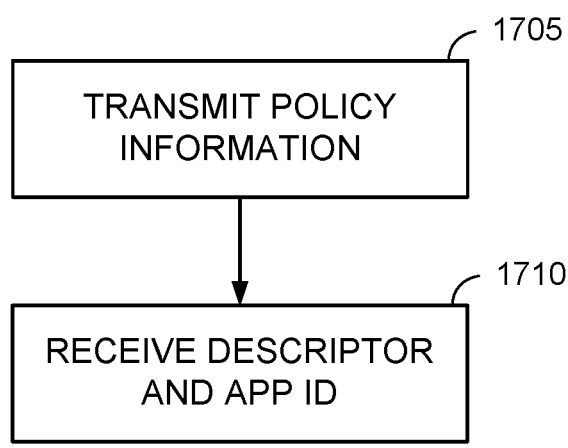
FIG. 17 illustrates a process flow diagram for another example of a method of network communication including application traffic pairing.

FIG. 17 illustrates a process flow diagram for another example of a method of network communication including application traffic pairing. The method shown in FIG. 17 may be implemented in one or more of the devices described above such as those in FIGS. 1, 2, 3, and 16.

At node 1705, policy information for one or more applications is transmitted. The policy information includes one or more application identifiers for traffic reporting. At node 1710, a traffic descriptor and one of the application identifiers for an application of the one or more applications are received. The traffic descriptor and the one of the application identifiers uniquely identify a traffic flow for the application.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of network communication via a wireless communication device, the method comprising:
    receiving, at the wireless communication device from an application traffic pairing (ATP) server, policy information including a reporting frequency and one or more application identifiers for traffic flow reporting;
    storing the received policy information;
    identifying an active application, the active application requesting a network resource for a traffic flow for the active application;
    generating a traffic descriptor for the traffic flow and an application identifier for the active application; and
    when the application identifier for the active application is included in the policy information, transmitting, from the wireless communication device to the ATP server, the traffic descriptor for the traffic flow and the application identifier for the active application, the traffic descriptor and the application identifier uniquely identifying the traffic flow for the active application, wherein the wireless communication device transmits the traffic descriptor and the application identifier to the ATP server based on the reporting frequency received from the ATP server.

2. The method of claim 1, wherein the policy information further includes application connection information to be reported, and wherein the traffic descriptor includes the application connection information to be reported.

3. The method of claim 1, wherein the active application requests one or more of an HTTP connection, an HTTPS connection, a SIP connection, an FTP connection, a TCP connection, an SSH connection, an RCP connection, a binary protocol connection, or a SOCKS connection.

4. The method of claim 1, wherein identifying the active application is based on stored application connection information for a connection associated with the active application.

5. The method of claim 4, wherein the application connection information comprises one or more of a source network address for a connection associated with the active application, a source port for a connection associated with the active application, a destination network address for a connection associated with the active application, a destination port for a connection associated with the active application, a network protocol for a connection associated with the active application, a connection start time, a connection idle time, a connection active time, a transmitted data quantity indicating an amount of data transmitted via a connection associated with the active application, a received data quantity indicating an amount of data received via a connection associated with the active application, a device configuration, or the application identifier.

6. The method of claim 1, wherein the traffic descriptor includes one or more of a source network address for a connection associated with the active application, a source port for a connection associated with the active application, a destination network address for a connection associated with the active application, a destination port for a connection associated with the active application, or a network protocol for a connection associated with the active application.

7. The method of claim 1, wherein the transmission comprises one of an HTTP transmission, an HTTPS transmission, an SMS transmission, or transmission according to a predetermined communication protocol.

8. The method of claim 1, wherein receiving the policy information comprises:
identifying an application to be installed on the device;
transmitting, to the ATP server, a selection of a policy for the active application; and
receiving the policy information for the active application, the policy information associated with the selection.

9. The method of claim 1, further comprising:
receiving additional policy information; and
updating the policy information stored based on the received additional policy information.

10. A wireless communication device comprising:
a receiver configured to receive, from an application traffic pairing (ATP) server, policy information including a reporting frequency and one or more application identifiers for traffic flow reporting;
a memory configured to store the received policy information;
a processor configured to:
identify an active application, the active application requesting a network resource for a traffic flow for the active application;
generate a traffic descriptor for the traffic flow and an application identifier for the active application; and
a transmitter configured to, when the application identifier is included in the policy information, transmit, to the ATP server, the traffic descriptor for the traffic flow and the application identifier for the active application, the traffic descriptor and the application identifier for the active application uniquely identifying the traffic flow for the active application, wherein the wireless communication device transmits the traffic descriptor and the application identifier to the ATP server based on the reporting frequency received from the ATP server.

11. The device of claim 10, wherein the policy information further includes application connection information to be reported, and wherein the traffic descriptor includes the application connection information to be reported.

12. The device of claim 10, further comprising a secure element coupled with said memory, the secure element configured to encrypt the received policy information for storage.

13. The device of claim 10, further comprising a modem, wherein the modem provides application connection information for the active application.

14. The device of claim 13, wherein the application connection information comprises one or more of a source network address for a connection associated with the active application, a source port for a connection associated with the active application, a destination network address for a connection, a destination port for a connection associated with the active application, a network protocol for a connection associated with the active application, a connection start time, a connection idle time, a connection active time, a transmitted data quantity indicating an amount of data transmitted via a connection associated with the active application, a received data quantity indicating an amount of data received via a connection associated with the active application, a device configuration, or the application identifier.

15. The device of claim 10, wherein the traffic descriptor includes one or more of a source network address for a connection associated with the active application, a source port for a connection associated with the active application, a destination network address for a connection, a destination port for the connection, or a network protocol for a connection.

16. The device of claim 10, further comprising an application installation interface configured to identify an application to be installed on the device and a policy for the active application, wherein the transmitter is configured transmit a selection of a policy for the active application, and wherein the receiver is configured to receive the policy information for the active application.

17. A method of network communication via an application traffic pairing (ATP) server, the method comprising:
transmitting, from the ATP server to a wireless communication device, policy information for one or more applications, the policy information including a reporting frequency and one or more application identifiers for traffic flow reporting to enable each of identification of an active application, request of a network resource for a traffic flow for the active application, generation of a traffic descriptor for the traffic flow, and generation of an application identifier for the active application; and
receiving, at the ATP server from the wireless communication device, the traffic descriptor and the application identifier for the active application, said traffic descriptor and said application identifier uniquely identifying the traffic flow for the active application, wherein the ATP server receives the traffic descriptor and the application identifier for the active application from the wireless communication device based on the reporting frequency transmitted to the wireless communication device.

18. The method of claim 17, further comprising altering the traffic flow, wherein altering the traffic flow includes one or more of terminating the traffic flow, adjusting a communication rate for the traffic flow, or providing quality of service for the traffic flow.

19. The method of claim 17, wherein the policy information further includes application connection information to be reported, and wherein the traffic descriptor includes the application connection information to be reported.

20. The method of claim 17, wherein the active application requests one or more of an HTTP connection, an HTTPS connection, a SIP connection, an FTP connection, a TCP connection, an SSH connection, an RCP connection, a binary protocol connection, or a SOCKS connection.

21. The method of claim 17, wherein the traffic descriptor includes one or more of a source network address for the connection associated with the active application, a source port for the connection associated with the active application, a destination network address for the connection, a destination port for the connection, or a network protocol for the connection.

22. The method of claim 17, further comprising:
receiving policy information for the one or more applications;
updating the policy information based on the received policy information; and
transmitting the updated policy information.

23. The method of claim 17, further comprising:

receiving, from a user equipment, a message requesting the policy information; and transmitting the policy information to the user equipment.

24. An application traffic pairing (ATP) server comprising:

a transmitter configured to transmit, to a wireless communication device, policy information for one or more applications, the policy information including a reporting frequency and one or more application identifiers for traffic flow reporting to enable each of identification of an active application, request of a network resource for a traffic flow for the active application, generation of a traffic descriptor for the traffic flow, and generation of an application identifier for the active application; and a receiver configured to receive, from the wireless communication device, the traffic descriptor and the application identifier for the active application, said traffic descriptor and said application identifier uniquely identifying the traffic flow for an application associated with the one of the application identifiers, wherein the ATP server device receives the traffic descriptor and the application identifier for the active application from the wireless communication device based on the reporting frequency transmitted to the wireless communication device.

25. The device of claim 24, further comprising a processor configured to alter the communication path wherein altering the communication path includes one or more of terminating the communication path, adjusting a communication rate for the communication path, or providing quality of service for the communication path.

26. The device of claim 24, wherein the policy information further includes application connection information to be reported, and wherein the traffic descriptor includes the application connection information to be reported.

27. The device of claim 24, wherein the communication path includes one or more of an HTTP connection, an HTTPS connection, a SIP connection, an FTP connection, a TCP connection, an SSH connection, an RCP connection, a binary protocol connection, or a SOCKS connection.

28. The device of claim 24, wherein the traffic descriptor includes one or more of a source network address for the connection associated with the active application, a source port for the connection associated with the active application, a destination network address for the connection, a destination port for the connection, or a network protocol for the connection.

* * * * *